US012592600B2

(12) United States Patent
Yamada et al.

(10) Patent No.: US 12,592,600 B2
(45) Date of Patent: Mar. 31, 2026

(54) MOTOR

(71) Applicant: MINEBEA MITSUMI Inc., Nagano (JP)

(72) Inventors: Takuji Yamada, Kitasaku-gun (JP); Hiroaki Murakami, Kitasaku-gun (JP); Youko Tamura, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 396 days.

(21) Appl. No.: 18/249,261

(22) PCT Filed: Oct. 22, 2021

(86) PCT No.: PCT/JP2021/039038
§ 371 (c)(1),
(2) Date: Nov. 9, 2023

(87) PCT Pub. No.: WO2022/085780
PCT Pub. Date: Apr. 28, 2022

(65) Prior Publication Data
US 2024/0339883 A1     Oct. 10, 2024

(30) Foreign Application Priority Data

Oct. 23, 2020     (JP) ................................. 2020-177930
Oct. 23, 2020     (JP) ................................. 2020-177931
(Continued)

(51) Int. Cl.
*H02K 3/34* (2006.01)
*H02K 1/14* (2006.01)
(52) U.S. Cl.
CPC ................. *H02K 3/34* (2013.01); *H02K 1/14* (2013.01)

(58) Field of Classification Search
CPC ........ H02K 3/34; H02K 1/14; H02K 2203/06; H02K 1/148; H02K 2203/12; H02K 3/522
See application file for complete search history.

(56) References Cited

U.S. PATENT DOCUMENTS 9,000,629 B2     4/2015   Yokogawa et al.
9,172,289 B2     10/2015  Kreidler et al.
(Continued)

FOREIGN PATENT DOCUMENTS

JP       2002284446 A  * 10/2002
JP       2006129623 A  *  5/2006
(Continued)

OTHER PUBLICATIONS

JP-2002284446-A_translate (Year: 2002).*
(Continued)

*Primary Examiner* — Tulsidas C Patel
*Assistant Examiner* — Mohammed Ahmed Qureshi
(74) *Attorney, Agent, or Firm* — Chrisman Gallo Tochtrop LLC

(57) ABSTRACT

In a motor of an embodiment, an insulator includes a wall part having two recess parts (an insulator-side first recess part and an insulator-side second recess part) opposed to two drawing positions of a conducting wire drawn out from a coil in a radial direction. One of the two drawing positions is located at an outer peripheral portion of the coil, and the other is located at an inside of the outer peripheral portion. A substrate includes a substrate-side first recess part and a substrate-side second recess part recessed at an inside in the radial direction from an outer peripheral end and adjacent to each other in a circumferential direction. The substrate-side first recess part is opposed to the insulator-side first recess part (Continued)

part, and the substrate-side second recess part is opposed to the insulator-side second recess part.

16 Claims, 24 Drawing Sheets

(30)         Foreign Application Priority Data

| Oct. 23, 2020 | (JP) | ................................. 2020-177932 |
|---|---|---|
| Oct. 23, 2020 | (JP) | ................................. 2020-177933 |

(56)         References Cited

U.S. PATENT DOCUMENTS

| 9,209,658 | B2 | 12/2015 | Haga et al. | |
|---|---|---|---|---|
| 9,397,527 | B2 | 7/2016 | Haga et al. | |
| 10,348,150 | B2 | 7/2019 | Miyamoto et al. | |
| 2012/0286593 | A1 | 11/2012 | Yokogawa et al. | |
| 2012/0293024 | A1 | 11/2012 | Yokogawa et al. | |
| 2012/0313477 | A1* | 12/2012 | Haga | H02K 3/28 |
| | | | | 310/215 |
| 2014/0145545 | A1* | 5/2014 | Kreidler | H02K 15/00 |
| | | | | 29/598 |
| 2014/0183992 | A1 | 7/2014 | Seo et al. | |
| 2014/0375161 | A1 | 12/2014 | Haga et al. | |
| 2016/0156242 | A1* | 6/2016 | Eckert | H02K 3/522 |
| | | | | 310/68 R |

FOREIGN PATENT DOCUMENTS

| JP | 2011-151875 | A | | 8/2011 |
|---|---|---|---|---|
| JP | 2011-205877 | A | | 10/2011 |
| JP | 2013-021904 | A | | 1/2013 |
| JP | 2013021880 | A | * | 1/2013 |
| JP | 2014-011850 | A | | 1/2014 |
| JP | 2014-023299 | A | | 2/2014 |
| JP | 2014-060859 | A | | 4/2014 |
| JP | 5743768 | B2 | | 7/2015 |
| JP | 2020-025417 | A | | 2/2020 |
| WO | 2019224721 | A1 | | 11/2019 |

OTHER PUBLICATIONS

JP-2013021880-A_translate (Year: 2013).*
JP-2006129623-A_translate (Year: 2006).*
English translation of the Written Opinion for corresponding International Application No. PCT/JP2021/039038 dated Jan. 11, 2022.
Notice of Reasons for Refusal dated Dec. 25, 2024 for corresponding Japanese Application No. 2020-177932 and English translation.
Extended European Search Report dated Dec. 2, 2024 for corresponding European Application No. 21882919.0.
International Search Report for corresponding International Application No. PCT/JP2021/039038 dated Jan. 11, 2022.
Written Opinion for corresponding International Application No. PCT/JP2021/039038 dated Jan. 11, 2022.

* cited by examiner

FIRST DIRECTION

AXIAL DIRECTION

SECOND DIRECTION

CIRCUMFERENTIAL DIRECTION

RADIAL DIRECTION

MOTOR

CROSS-REFERENCE TO RELATED APPLICATIONS

This application is a national stage entry of International Application No. PCT/JP2021/039038 filed on Oct. 22, 2021, which claims the benefit of priority to Japanese Application Nos. JP2020-177930, filed Oct. 23, 2020, JP2020-177931 filed on Oct. 23, 2020, JP2020-177932 filed on Oct. 23, 2020 and JP2020-177933 filed on Oct. 23, 2020, the entire disclosures of which are hereby incorporated herein by reference.

TECHNICAL FIELD

The present invention relates to a motor.

BACKGROUND ART

In the related art, a motor includes a plurality of stator cores, and both ends of a conducting wire wound around each stator core are physically and electrically connected to a connection member such as a bus bar or a substrate (for example, see PTL 1).

CITATION LIST

Patent Literature

PTL 1: JP 2011-205877 A

SUMMARY OF INVENTION

Technical Problem

However, in a case where the connection member is a substrate, for example, when a conducting wire (hereinafter, also referred to as a "draw wire") drawn out from a coil is routed to the substrate disposed at the stator core, since the draw wire interferes with a wall part of an insulator, routing of the conducting wire is not easy, and the configuration needs to be improved in terms of the assemblability of the conducting wire with respect to the substrate.

An object of the present invention is to provide a motor capable of improving the assemblability of a conducting wire with respect to a substrate.

Solution to Problem

A motor according to an aspect of the present invention includes a stator including a magnetic body, an insulator surrounding the magnetic body, and a coil formed of a conducting wire wound around the magnetic body via the insulator, and a substrate having an annular shape provided at the stator, wherein, of two drawing positions of the conducting wire drawn out from the coil, one drawing position is in an outer peripheral portion of the coil and the other drawing position is at an inside of the outer peripheral portion. The substrate includes a first recess part and a second recess part recessed at the inside in a radial direction from an outer peripheral end and adjacent to each other in a circumferential direction, the insulator includes a wall part located at an outer peripheral side of the substrate in an assembled state with the substrate assembled to the stator, the wall part includes a third recess part opposed to one of the two drawing positions of the conducting wire and a fourth recess part opposed to the other of the two drawing positions of the conducting wire, the first recess part is opposed to the third recess part, and the second recess part is opposed to the fourth recess part.

According to an aspect of the present invention, the assemblability of a conducting wire with respect to a substrate can be improved.

Furthermore, a motor according to another aspect of the present invention includes a coil formed of a conducting wire; and an insulator including an outer surface surrounded by the coil, wherein the outer surface of the insulator includes a plurality of recess parts and a flat surface, and parts of the conducting wire opposed to the flat surface are spaced from parts of the conducting wire fitted into the plurality of recess parts.

According to another aspect of the present invention, contact between coils wound around stator cores adjacent to each other in a circumferential direction can be suppressed.

A motor according to further another aspect of the present invention includes: a stator including a magnetic body and a conducting wire wound around the magnetic body; and a substrate having an annular shape provided at the stator, wherein the substrate includes a first recess part and a second recess part recessed at an inside in a radial direction from an outer peripheral end and adjacent to each other in a circumferential direction, and, of two end parts of the conducting wire, a first end part is located at an inside of the first recess part and a second end part is located at an inside of the second recess part, and the first end part and the second end part are disposed in a direction opposing each other in the circumferential direction.

According to further another aspect of the present invention, a load applied to a conducting wire arranged between a stator and a substrate can be reduced.

A motor according to a still another aspect of the present invention includes: a stator including a magnetic body and a conducting wire wound around the magnetic body; and a substrate having an annular shape provided at the stator, wherein the substrate includes one or more recess parts recessed at an inside in a radial direction from an outer peripheral end, and a land having conductivity and connected to the conducting wire, an end part of the conducting wire being disposed at an inside of the recess part, the land includes a first land disposed at a front surface side of the substrate along the recess part, a second land disposed at a rear surface side of the substrate along the recess part, and a third land disposed at an inner peripheral surface of the recess part, and the first land, the second land, and the third land communicate with one another.

According to still another aspect of the present invention, the assemblability of a conducting wire with respect to a substrate can be improved.

DESCRIPTION OF EMBODIMENTS

Figure 1:
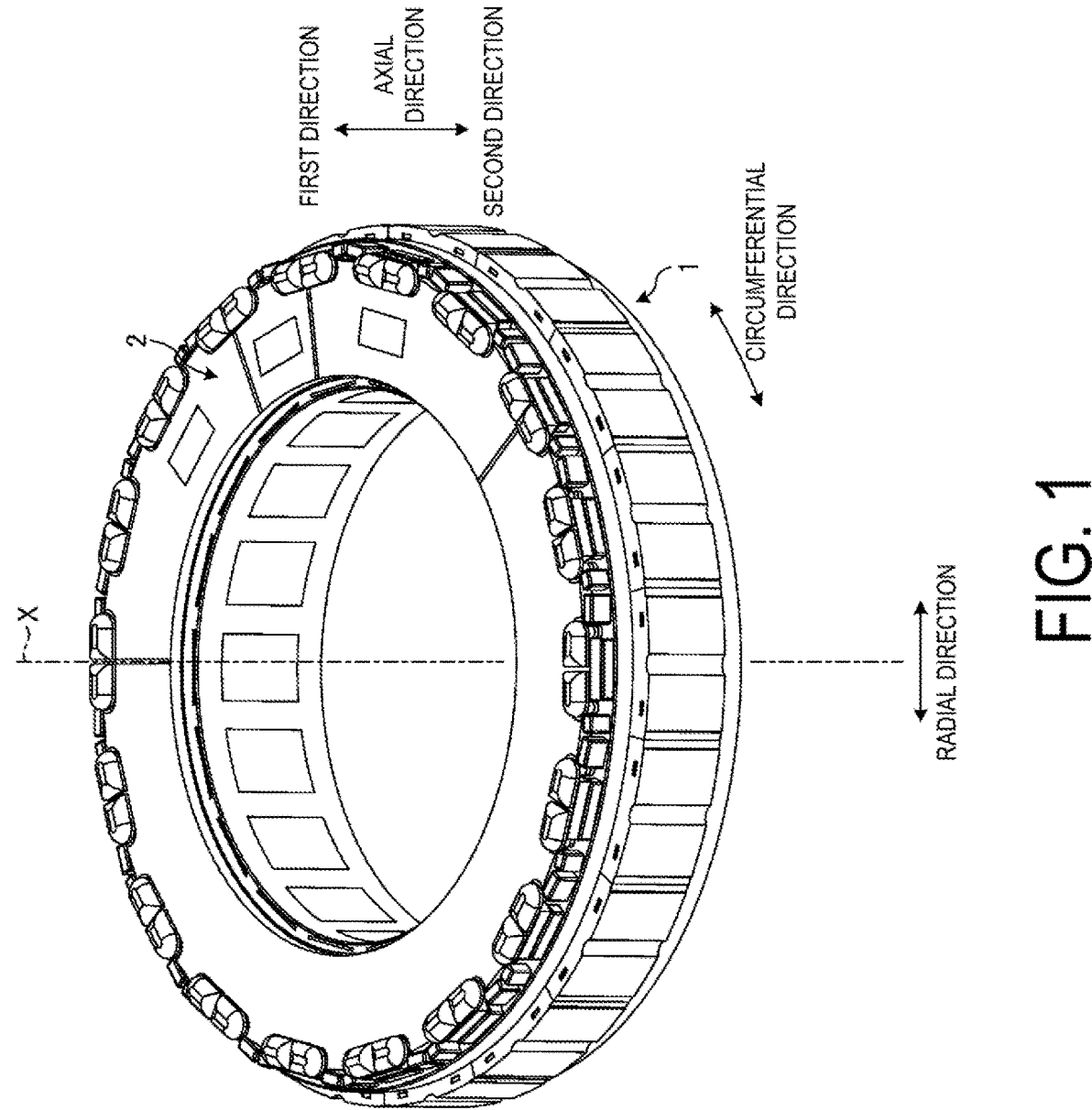
FIG. 1 is an external perspective view of a stator according to an embodiment.

An embodiment of the present invention is described below with reference to the drawings. Note that the present invention is not limited by the following embodiment. Furthermore, the dimensional relationships between elements, proportions of the elements, and the like in the drawings may differ from reality. The drawings may each include parts having mutually different dimensional relationships and proportions. Furthermore, the contents described in one embodiment or modification example are applied in principle to other embodiments or modification examples.

EMBODIMENT

Figure 2:
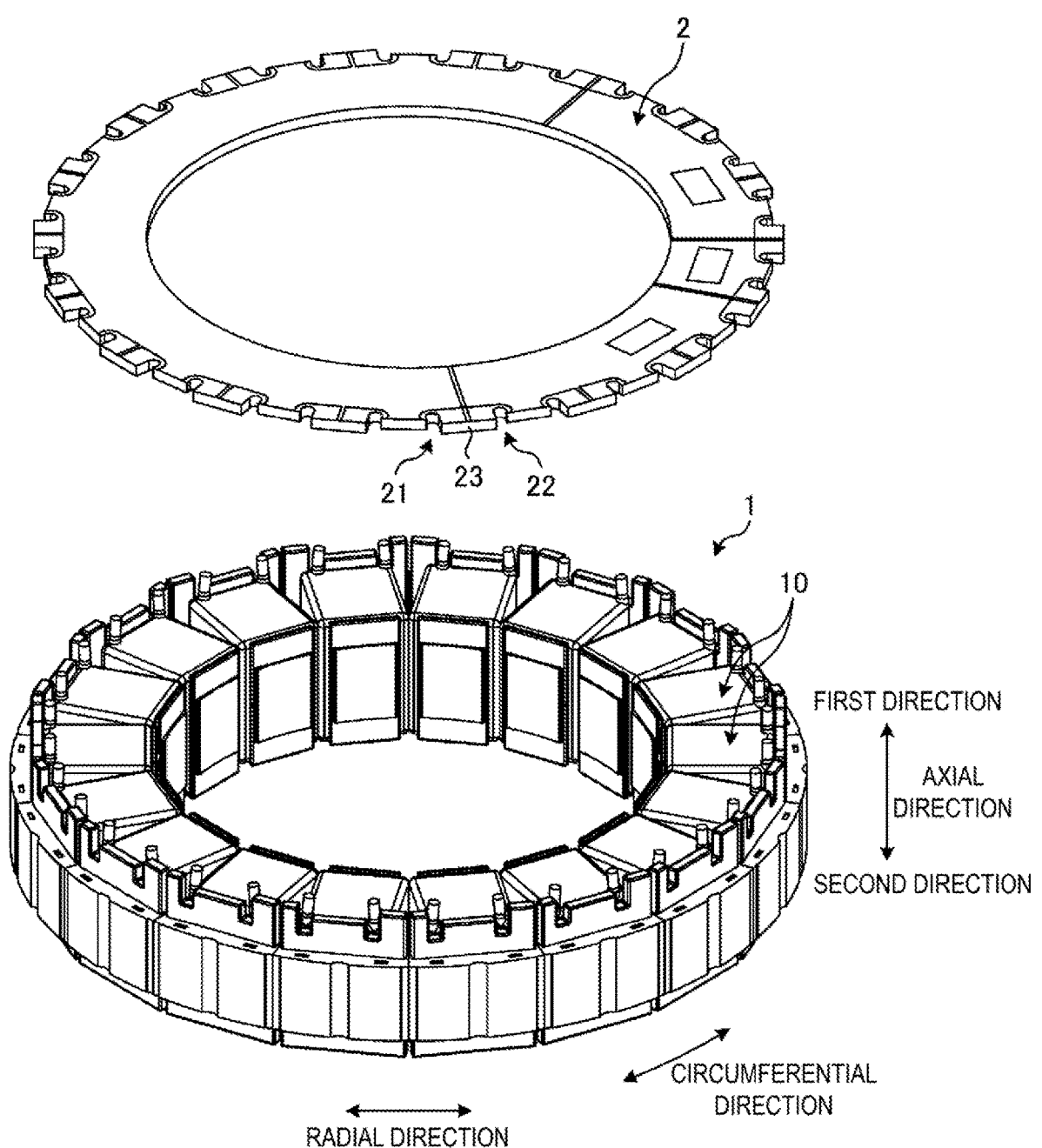
FIG. 2 is a partially exploded perspective view of the stator according to the embodiment.
Figure 3:
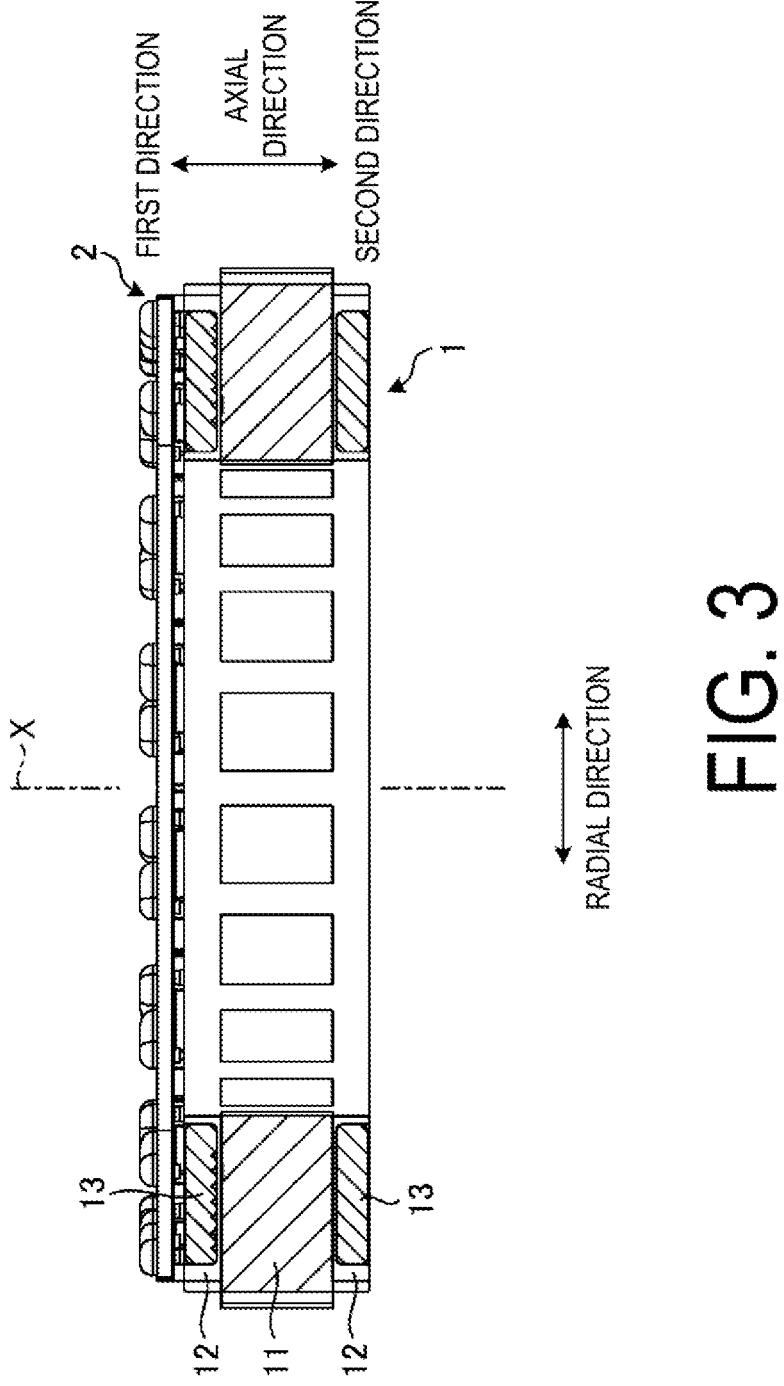
FIG. 3 is a vertical sectional view of the stator according to the embodiment.
Figure 4:
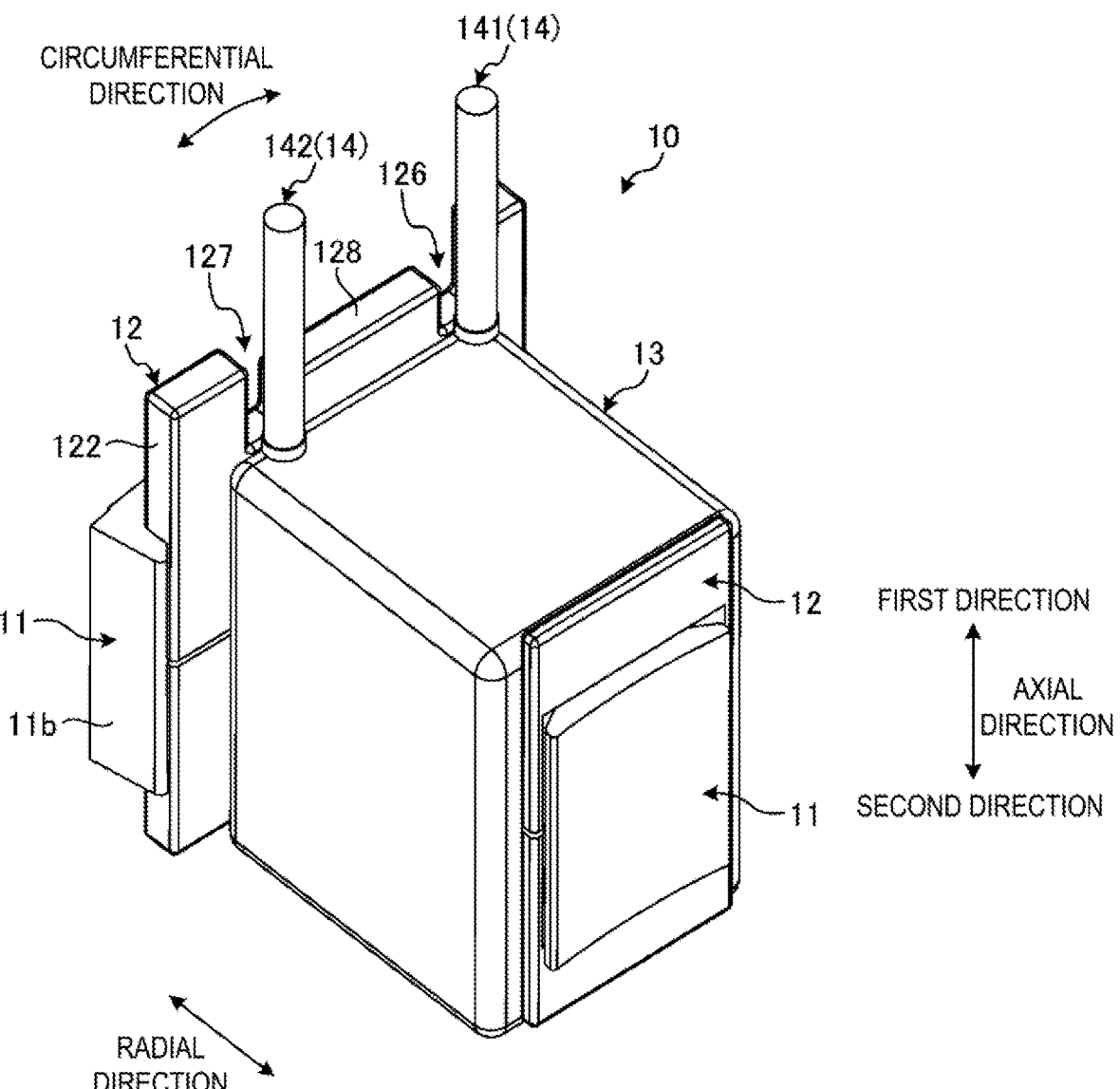
FIG. 4 is an external perspective view of a segment core constituting the stator.
Figure 5:
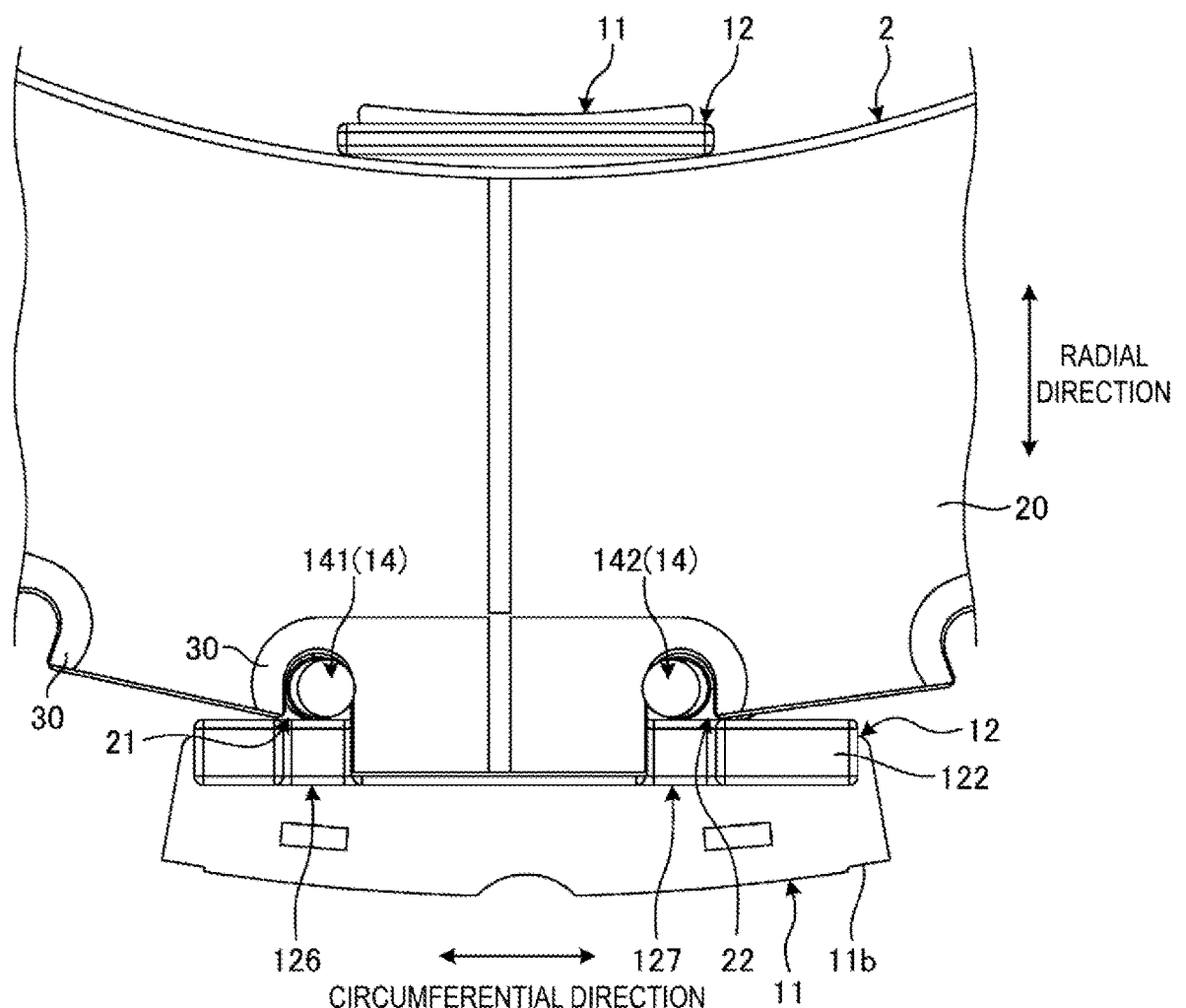
FIG. 5 is an enlarged plan view of a connection portion between the segment core and a substrate.
Figure 6:
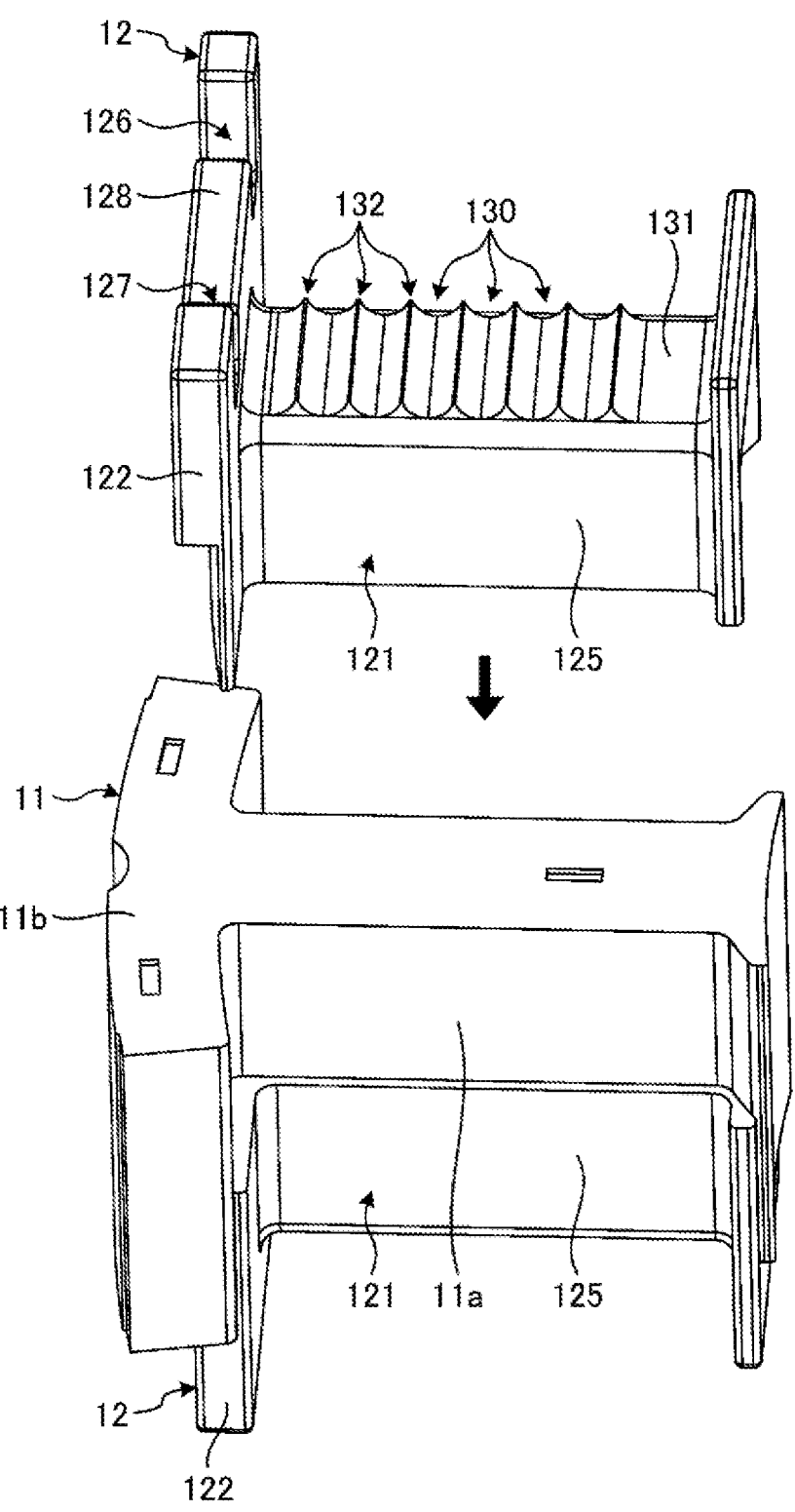
FIG. 6 is a partially exploded perspective view of the segment core.
Figure 7:
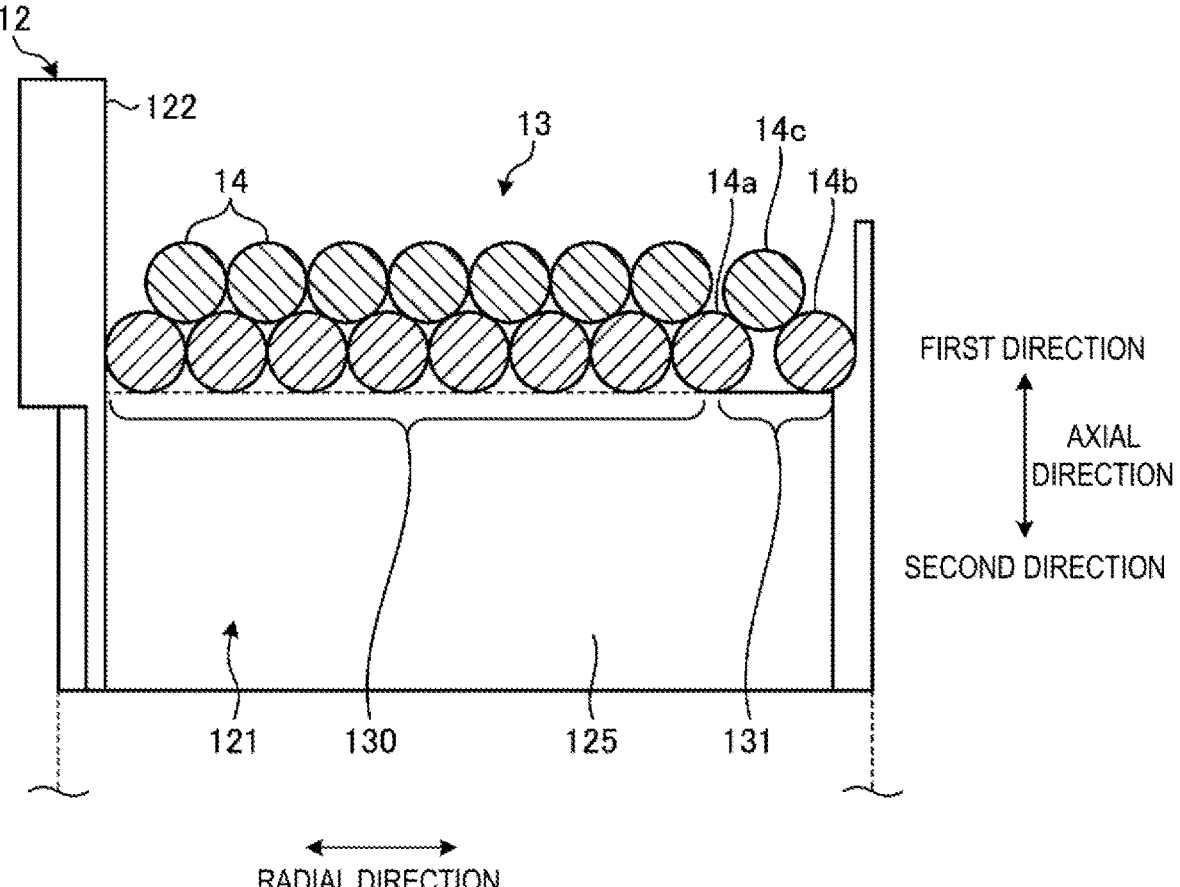
FIG. 7 is a schematic cross-sectional view of an insulator and a coil constituting the segment core.
Figure 8:
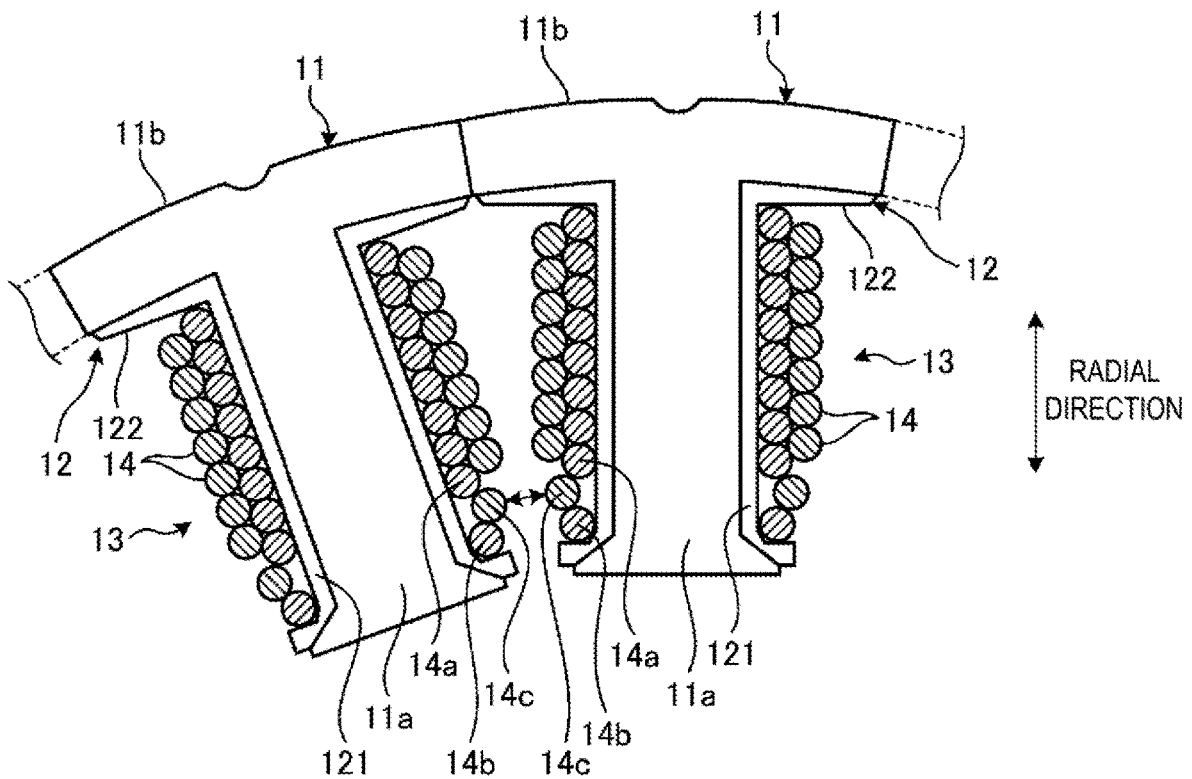
FIG. 8 is a schematic cross-sectional view of adjacent segment cores.
Figure 9:
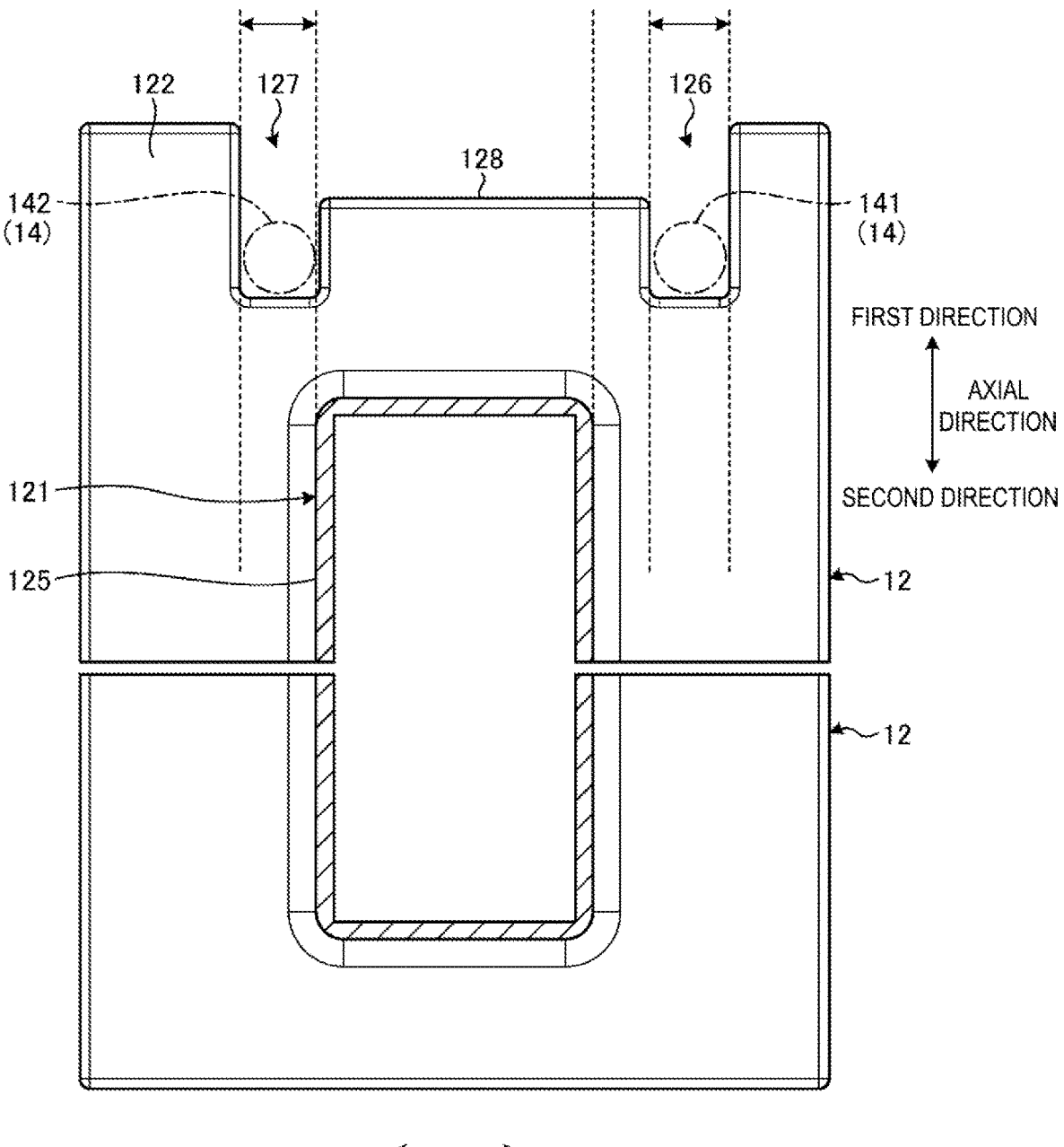
FIG. 9 is a vertical sectional view of the insulator.
Figure 10:
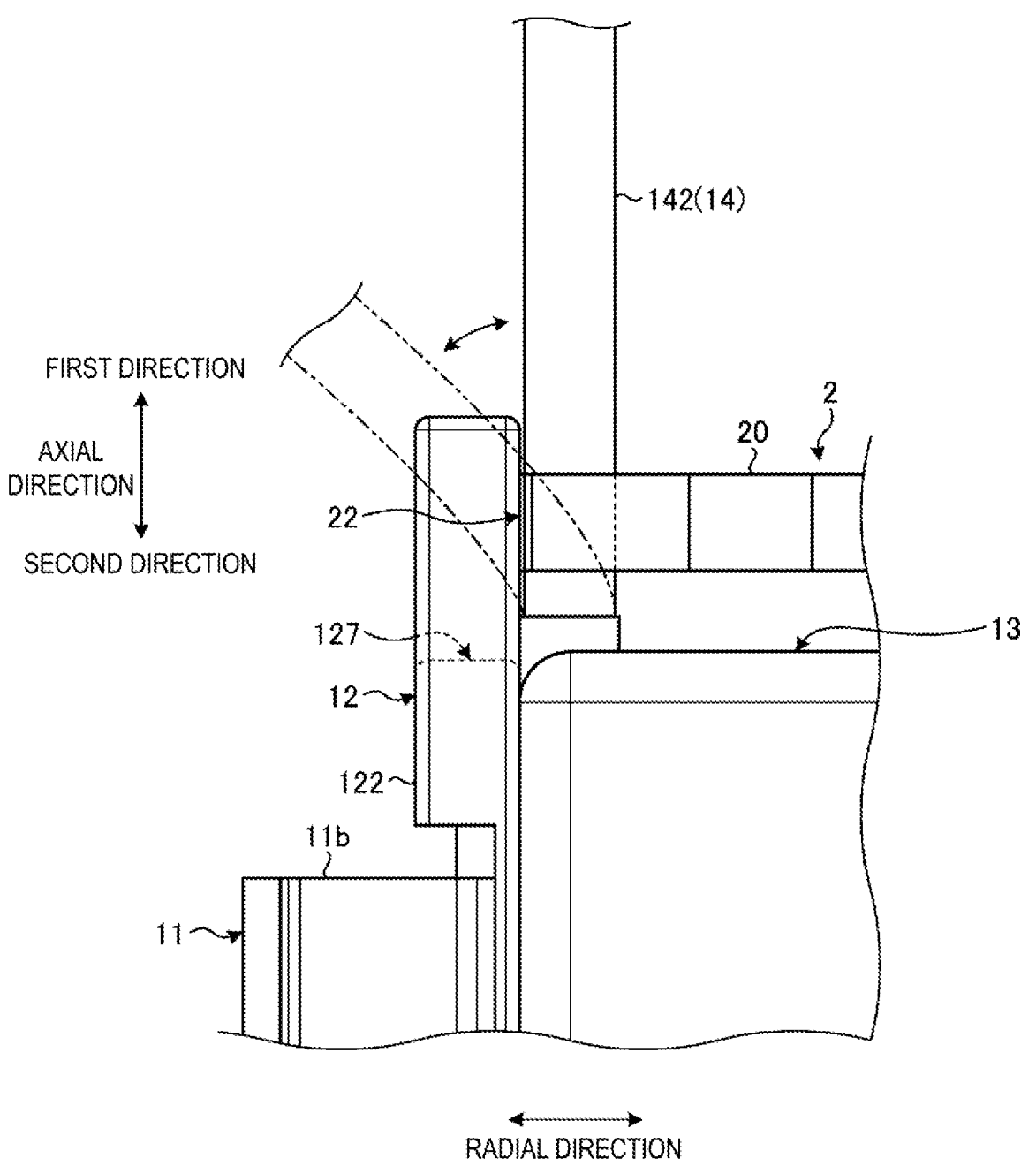
FIG. 10 is a schematic view illustrating a change in a position of a conducting wire when the substrate is assembled to the segment core.
Figure 11A:
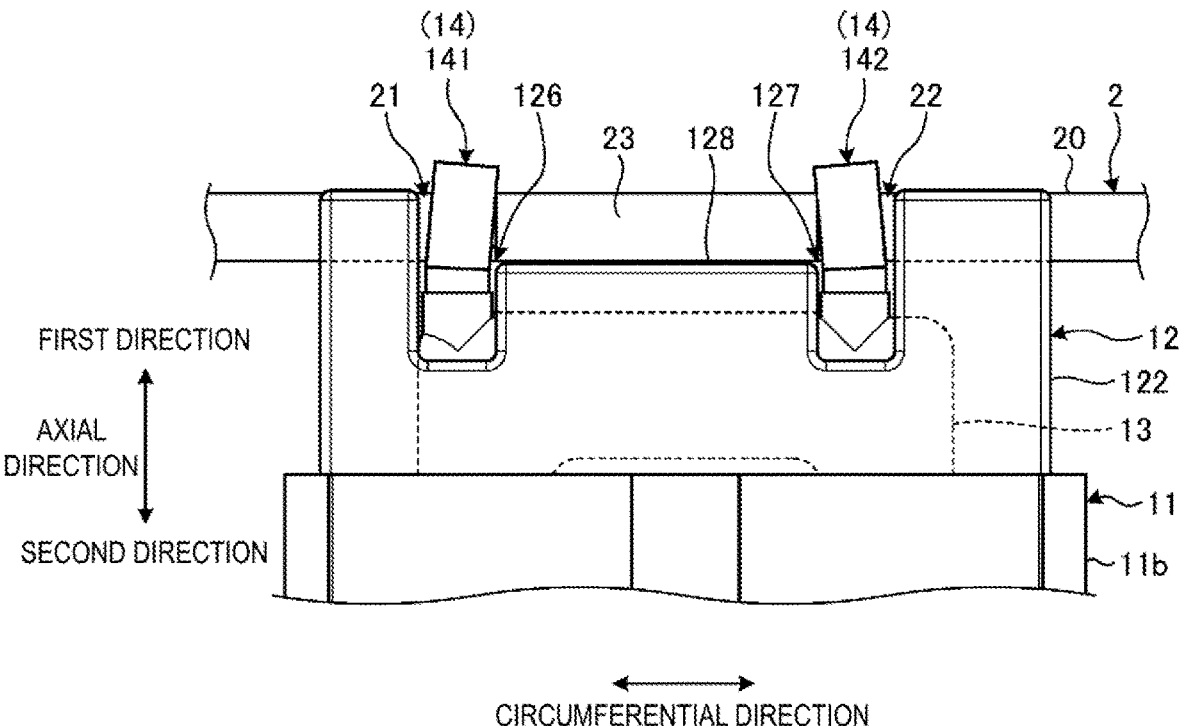
FIG. 11A is an enlarged side view of the connection portion between the segment core and the substrate.
Figure 11B:
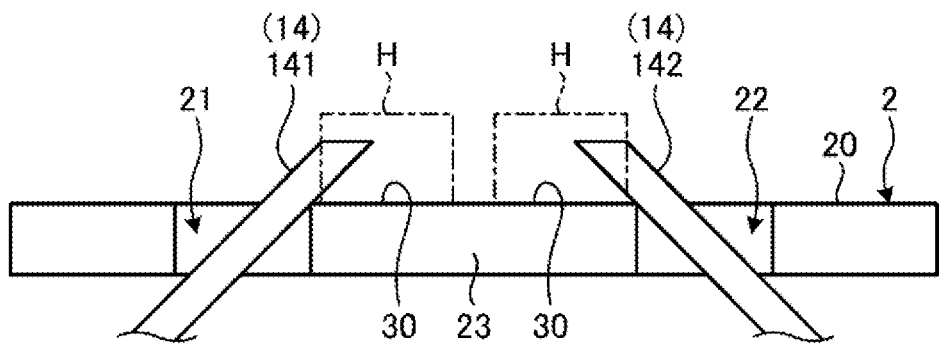
FIG. 11B is a schematic view illustrating an example of a soldering state of the conducting wire to a substrate recess part.

FIG. 1 is an external perspective view of a stator according to an embodiment. FIG. 2 is a partially exploded perspective view of a stator according to the embodiment. FIG. 3 is a vertical sectional view of the stator according to the embodiment. FIG. 4 is an external perspective view of a segment core constituting the stator. FIG. 5 is an enlarged plan view of a connection portion between the segment core and a substrate. FIG. 6 is a partially exploded perspective view of the segment core. FIG. 7 is a schematic cross-sectional view of an insulator and a coil constituting the segment core. FIG. 8 is a schematic cross-sectional view of adjacent segment cores. FIG. 9 is a vertical sectional view of the insulator. FIG. 10 is a schematic view illustrating a change in a position of a conducting wire when the substrate is assembled to the segment core. FIG. 11A is an enlarged side view of the connection portion between the segment core and the substrate. FIG. 11B is a schematic view illustrating an example of a soldering state of the conducting wire to a substrate recess part.

Note that in the following description, for convenience, the axial direction in the illustration is a rotational axis direction of the motor of the present embodiment. In the axial direction, one direction is a first direction and the other direction is a second direction. The radial direction illustrated in the drawing is the radial direction orthogonal to the rotational axis direction of the motor of the present embodiment. In the radial direction, a direction away from a rotational axis X illustrated is the outside in the radial direction, and the direction toward the rotational axis X is the inside in the radial direction. The circumferential direction illustrated in the drawing is a direction coinciding with the rotational direction of the motor of the present embodiment.

A stator 1 according to the present embodiment is applied to, for example, an inner rotor type brushless motor or the like. A motor of the present embodiment includes an inner rotor as a rotor, a shaft fixed at the inner rotor, the stator 1 having a coil and a magnetic body wound around with the coil, and a substrate 2 having an annular shape provided at the stator 1. The motor employing the stator 1 is not limited to a brushless motor.

The stator 1 illustrated in FIG. 1 is disposed to surround the inner rotor (not illustrated). As illustrated in FIG. 4, the stator 1 includes a plurality of segment cores 10 as so-called segment cores. The stator 1 is formed by disposing the plurality of segment cores 10 along the circumferential direction in an annular shape and joining and integrating the adjacent segment cores 10. As illustrated in FIG. 2, in the stator 1, the substrate 2 formed in an annular shape is disposed at the side of the first direction in the axial direction. The plurality of segment cores 10 are integrated by insert molding while being disposed along the circumferential direction in an annular shape, for example.

As illustrated in FIGS. 3 and 4, the segment core 10 includes a stator core 11, an insulator 12, and a coil 13 surrounding the stator core 11 via the insulator 12.

The stator core 11 is a magnetic body having a layered structure obtained by layering a plurality of electromagnetic steel plates and the like, for example. A plurality of the stator cores 11 is disposed along the circumferential direction in an annular shape. The stator core 11 includes a tooth part 11a and a yoke part 11b. The tooth part 11a extends to the inside in the radial direction from an inner peripheral side of the yoke part 11b. As illustrated in FIG. 8, the yoke part 11b is connected to the adjacent yoke part 11b in the circumferential direction, with the plurality of segment cores 10 disposed along the circumferential direction in an annular shape.

The insulator 12 is formed of, for example, an insulating body and is interposed between the stator core 11 and the coil 13 to electrically insulate the coil 13 and the stator core 11. As illustrated in FIG. 6, the insulator 12 includes an accommodation part 121 accommodating the stator core 11 inside, and a wall part 122 formed at an end part at the outside in the radial direction of the accommodation part 121. The insulator 12 is formed to be divided into two parts, and can accommodate the stator core 11 inside in the divided state.

The wall part 122 is located at the outer peripheral side of the substrate 2 in an assembled state with the substrate 2 assembled to the stator 1. When viewed from the radial direction, the wall part 122 is formed in a substantially rectangular shape, and is formed to protrude from the yoke part 11*b* in the axial direction. The wall part 122 includes two recess parts in the radial direction opposed to the drawing positions of two conducting wires 14 drawn out from the coil 13. Specifically, as illustrated in FIG. 9, the wall part 122 includes an insulator-side first recess part 126 and an insulator-side second recess part 127.

The insulator-side first recess part 126 (third recess part) is formed corresponding to one of the drawing positions of the conducting wire 14, and the one conducting wire 14 is disposed at the inside along the direction intersecting the extending direction of the one conducting wire 14. The insulator-side second recess part 127 (fourth recess part) is formed corresponding to the other of the drawing positions of the conducting wire 14, and the other conducting wire 14 is disposed at the inside along the direction intersecting the extending direction of the other conducting wire 14. As illustrated in FIGS. 5 and 11A, the insulator-side first recess part 126 and the insulator-side second recess part 127 are formed at the segment core 10 at positions opposed to the drawing positions of the conducting wire 14 drawn from the coil 13. Specifically, the insulator-side first recess part 126 is formed at the segment core 10 at a position opposed to a first end part 141 of the conducting wire 14 drawn out from the coil 13. The insulator-side second recess part 127 is formed at the segment core 10 at a position opposed to a second end part 142 of the conducting wire 14 drawn out from the coil 13. An insulator-side protruding part 128 is formed between the insulator-side first recess part 126 and the insulator-side second recess part 127 in the circumferential direction. The insulator-side protruding part 128 extends outward without protruding from an end part of the wall part 122 in the first direction in the axial direction. The insulator-side protruding part 128 is opposed to a substrate protruding part 23 in the axial direction in the assembled state with the substrate 2 assembled to the stator 1.

The insulator-side first recess part 126 and the insulator-side second recess part 127 are opposed to a substrate-side first recess part 21 and a substrate-side second recess part 22 of the substrate 2, respectively, in the assembled state with the substrate 2 assembled to the stator 1. Specifically, the insulator-side first recess part 126 is opposed to the substrate-side first recess part 21 in the assembled state with the substrate 2 assembled to the stator 1. The insulator-side second recess part 127 is opposed to the substrate-side second recess part 22 in the assembled state with the substrate 2 assembled to the stator 1. The insulator-side first recess part 126 and the insulator-side second recess part 127 form a space for allowing the first end part 141 and the second end part 142 of the conducting wire 14 to be escaped at the outside in the radial direction when the conducting wire 14 drawn out from the coil 13 is connected to the substrate 2. The substrate-side first recess part 21 and the substrate-side second recess part 22 of the substrate 2 form a space for joining the first end part 141 and the second end part 142 of the conducting wire 14 to the substrate 2 side when the conducting wire 14 drawn out from the coil 13 is connected to the substrate 2.

The accommodation part 121 is formed in a rectangular tubular shape when viewed along the radial direction, and the tooth part 11*a* is accommodated at an inside of the accommodation part 121 in an assembled state with the insulator 12 assembled to the stator core 11 (FIG. 6). The accommodation part 121 includes four outer surfaces 125 at an outer peripheral surface of the accommodation part 121. The outer surface 125 is wound around with the conducting wire 14. The outer surface 125 is surrounded by a plurality of layers of coil 13. As illustrated in FIGS. 7 and 8, the outer surface 125 of the present embodiment is surrounded by two layers of the coil 13. Among the four outer surfaces 125, two surfaces at both sides in the circumferential direction are each formed by only flat surfaces, and two surfaces at both sides in the axial direction are each formed by a plurality of recess parts 130 and a flat surface 131. Although the plurality of recess parts and the flat surface 131 are formed at the two surfaces in the present embodiment, the plurality of recess parts and the flat surface 131 may be formed at at least one surface.

The plurality of recess parts 130 are formed at the outside in the radial direction at two surfaces at both sides in the axial direction among the four outer surfaces 125 of the accommodation part 121. The recess parts 130 are continuously disposed along the radial direction. Each recess part 130 is, for example, a part protruding toward the side of the first direction in the axial direction and is surrounded by two protruding parts 132 adjacent to each other in the radial direction. The conducting wire 14 wound around the insulator 12 is stored in each recess part 130. As illustrated in FIG. 7, the positions of the conducting wire 14 wound around the plurality of recess parts 130 are regulated by the respective recess parts 130, and the conducting wire 14 is evenly disposed in a lattice shape along the tooth part 11*a* of the stator core 11.

The flat surface 131 is formed at the inside in the radial direction at two surfaces at both sides in the axial direction among the four outer surfaces 125 of the accommodation part 121 (FIG. 7). The flat surface 131 is formed at the inside in the radial direction of the outer surface 125 having the plurality of recess parts 130 formed at the outside in the radial direction, and is a flat surface having no recess parts 130. The length of the flat surface 131 in the radial direction is set to be longer than the length of an outer diameter of the conducting wire 14.

Parts of the conducting wire 14 wound around the flat surface 131 are spaced in the radial direction between adjacent conducting wires 14 in a first layer of the coil 13. Specifically, adjacent conducting wire 14*a* and conducting wire 14*b* of the first layer of the coil 13 are not in contact with each other but are spaced from each other in the radial direction (FIG. 7). On the other hand, in the first layer of the coil 13, parts of the conducting wire 14 fitted into the plurality of recess parts 130 are not spaced from each other in the radial direction between the adjacent conducting wires 14, but are in contact with each other.

Parts of the conducting wire 14 opposed to two flat surfaces 131 of two insulators 12 adjacent to each other in the circumferential direction face each other. Specifically, as illustrated in FIG. 8, in the two adjacent insulators 12, the conducting wire 14*a* to the conducting wire 14*c* opposed to the flat surface 131 of one of the two adjacent insulators 12 face the conducting wire 14*a* to the conducting wire 14*c* opposed to the flat surface 131 of the other insulator 12 in the circumferential direction.

Other parts of the conducting wire 14 stacked at parts of the conducting wire 14 opposed to the flat surface 131 are disposed at the inside in the circumferential direction with respect to other parts of the conducting wire 14 stacked at parts of the conducting wire 14 fitted into the plurality of recess parts 130. Specifically, as illustrated in FIG. 7, the conducting wire 14b of the ninth turn of the first layer of the coil 13 is wound to move to the inside in the radial direction, and the conducting wire 14c of the tenth turn being the first winding of the second layer is wound to be disposed at the inside in the circumferential direction (for example, at the side of the second direction in the axial direction) more than usual. In other words, the maximum height in the axial direction of the conducting wire 14c at the second layer side layered at the flat surface 131 is lower than the maximum height in the axial direction of the conducting wire 14 at the second layer side layered at the recess part 130 side. The spacing distance in the axial direction between the central axes of the conducting wire 14c at the second layer side and the flat surface 131 is shorter than the spacing distance between the central axes of the conducting wire 14 at the second layer side layered at the recess part 130 side and the outer surface 125.

Parts of the conducting wire 14 opposed to the flat surface 131 are exposed to the outside with respect to other parts of the conducting wire 14 stacked at parts of the conducting wire 14 fitted into the plurality of recess parts 130. Specifically, as illustrated in FIG. 7, among the conducting wires 14a to 14c opposed to the flat surface 131, the conducting wire 14a is not shielded from the outside by the conducting wire 14c or the like constituting the second layer of the coil 13, and is visible from the outside.

Parts of the conducting wire 14 opposed to the flat surface 131 are located away from the outer surface 125 with respect to parts of the conducting wire 14 fitted into the plurality of recess parts 130. Specifically, the conducting wire 14c being a part of the conducting wire opposed to the flat surface 131 is stacked between the conducting wire 14a and the conducting wire 14b, and thus is disposed at a position away from the outer surface 125 at the side of the first direction in the axial direction, so that the spacing distance in the case is smaller than the distance from other parts of the conducting wire 14 stacked at parts of the conducting wire 14 fitted into the plurality of recess parts 130 to the outer surface 125.

As illustrated in FIG. 9, the position in the circumferential direction of one of the insulator-side first recess part 126 and the insulator-side second recess part 127 is located at a position overlapping one (inside in the circumferential direction) of a pair of outer surfaces 125 opposed to each other in the circumferential direction among the outer surfaces of the accommodation part 121 when viewed in the radial direction. The position of the other recess part in the circumferential direction is shifted to the outer side in the circumferential direction when viewed from the radial direction with respect to the other (outside in the circumferential direction) of the pair of outer surfaces 125 opposed to each other in the circumferential direction.

The coil 13 is formed of the conducting wire 14 wound around the stator core 11 via the insulator 12. The coil 13 is disposed to surround the outer surface 125 of the insulator 12. The coil 13 is wound clockwise or counterclockwise around the tooth part 11a of the stator core 11 via the accommodation part 121 of the insulator 12. The coil 13 is formed of the conducting wire 14 wound in two layers; however, the embodiment is not limited the configuration. For example, the coil 13 may be wound with an even number of layers of two or more layers, or may be wound with an odd number of layers of one or more layers. The first end part 141 and the second end part 142 of the conducting wire

14 are drawn as draw wires from the coil 13 in the same direction. The first end part 141 and the second end part 142 are both drawn out from the coil 13 in the first direction of the axial direction. The first end part 141 is drawn out from the outer peripheral portion of the coil 13, and the drawing position of the first end part 141 is at the outer peripheral portion of the coil 13. The second end part 142 is drawn out from the inner peripheral portion of the coil 13, and the drawing position of the second end part 142 is at the inside of the outer peripheral portion of the coil 13.

The substrate 2 is disposed at the side of the first direction in the axial direction of the stator 1. The substrate 2 is formed of a resin material having an insulation property such as epoxy. An electronic component (not illustrated in the drawing) is disposed at the substrate 2. Examples of the electronic component include an inverter and a control IC. As illustrated in FIGS. 2, 5, 11A, and 11B, the substrate 2 includes a plurality of substrate-side first recess parts 21 and substrate-side second recess parts 22 recessed at the inside in the radial direction from the outer peripheral end and adjacent to each other in the circumferential direction.

As illustrated in FIG. 11A, the first end part 141 being one end part of the conducting wire 14 drawn from the coil 13 is passed through the substrate-side first recess part 21, in the assembled state with the substrate 2 assembled to the stator 1. As illustrated in FIG. 11A, the second end part 142 being the other end part of the conducting wire 14 drawn from the coil 13 is passed through the substrate-side second recess part 22, in the assembled state with the substrate 2 assembled to the stator 1. In the circumferential direction, the substrate protruding part 23 is formed between the substrate-side first recess part 21 and the substrate-side second recess part 22. The substrate protruding part 23 is formed to protrude to the outside in the radial direction from the outer periphery of a substrate body 20.

The first end part 141 of the conducting wire 14 is located at the inside of the substrate-side first recess part 21 and the second end part 142 is located at the inside of the substrate-side second recess part 22, in the assembled state with the substrate 2 assembled to the stator 1. The first end part 141 and the second end part 142 are disposed in a direction opposing each other in the circumferential direction. The first end part 141 is disposed at the inside of the substrate-side first recess part 21 in a state of being inclined toward the substrate-side second recess part 22 in the circumferential direction. The second end part 142 is disposed at the inside of the substrate-side second recess part 22 in a state of being inclined toward the substrate-side first recess part 21 in the circumferential direction. The first end part 141 and the second end part 142 interpose the substrate protruding part 23 between the substrate-side first recess part 21 and the substrate-side second recess part 22 in the circumferential direction. As illustrated in FIG. 11B, the first end part 141 and the second end part 142 are joined to a land 30 of the substrate 2 by, for example, a solder H, with the substrate protruding part 23 between the substrate-side first recess part 21 and the substrate-side second recess part 22 interposed between the first end part 141 and the second end part 142 in the circumferential direction.

The land 30 has conductivity and is connected to the conducting wire 14. As illustrated in FIG. 11B, the land 30 is physically and electrically connected by soldering to the first end part 141 and the second end part 142 of the conducting wire 14 drawn from the coil 13. The land 30 is provided at a substrate front surface 20a side.

An operation of forming the coil 13 by winding the conducting wire 14 around the insulator 12 in the present embodiment is described below. When the conducting wire 14 is wound around the insulator 12, the first layer of the coil 13 is wound along the plurality of recess parts 130 from the first turn to the eighth turn, and the ninth turn is wound around the flat surface 131. When the conducting wire 14c of the second layer of the coil 13 is wound from the state so as to be positioned between the wires 14a and 14b of the first layer, the ninth turn of the first layer of the coil 13 positioned at the innermost side in the radial direction is moved to the inside in the radial direction, and the tenth turn being the first winding of the second layer is wound so as to be positioned at the side of the second direction in the axial direction more than usual. That is, since the position in the radial direction of the conducting wire 14 disposed at the flat surface 131 is not regulated, the conducting wire 14 is moved by the force when the conducting wire 14c of the second layer is wound, and the conducting wire 14c of the second layer is guided to the side of the second direction in the axial direction. At this time, the conducting wire 14b of the first layer of the ninth turn opposed to the flat surface 131 of the insulator 12 is spaced from the conducting wire 14 of the first to eighth turns opposed to the plurality of recess parts 130. Therefore, parts of the conducting wire 14 opposed in the radial direction to the flat surface 131 are spaced from parts of the conducting wire 14 fitted into the plurality of recess parts 130. Thus, as illustrated in FIG. 8, the space between the conducting wires 14 wound around adjacent stator cores 11 can be widened, and an electrical short circuit due to contact between the adjacent conducting wires 14c of the coil 13 can be suppressed.

An operation of drawing the first end part 141 and the second end part 142 of the conducting wire 14 being the draw wire drawn from the coil 13 in the present embodiment and assembling the drawn first end part 141 and second end part 142 routed to the substrate-side first recess part 21 and the substrate-side second recess part 22 is described below. When the conducting wire 14 drawn out from the coil 13 is connected to the substrate 2, the first end part 141 and the second end part 142 of the conducting wire 14 are tilted toward the outside in the radial direction and are caused to escape to the inside of the insulator-side first recess part 126 and the insulator-side second recess part 127 of the insulator 12. Subsequently, the substrate 2 is assembled to the stator 1, and then the end parts of the conducting wire 14 escaped to the inside of the insulator-side first recess part 126 and the insulator-side second recess part 127 are inserted into the inside of the substrate-side first recess part 21 and the substrate-side second recess part 22. Thus, the stator 1 and the substrate 2 can be assembled without the conducting wire 14 interfering with the insulator 12.

As described above, the motor according to an aspect of the present invention includes the coil 13 formed of the conducting wire 14 and the insulator 12 having the outer surfaces 125 surrounded by the coil 13. The outer surface 125 of the insulator 12 includes the plurality of recess parts 130 and the flat surface 131. Parts of the conducting wire 14 opposed to the flat surface 131 are spaced from parts of the conducting wire 14 fitted into the plurality of recess parts 130. For example, when the coil 13 is formed by winding the conducting wire 14 around the insulator 12, the conducting wire 14 is wound along the plurality of recess parts 130 from the first turn to the eighth turn and is wound around the flat surface 131 at the ninth turn. As a consequence, the conducting wire 14 of the ninth turn in the first layer is moved to the inside in the radial direction, and the conducting wire 14 of the tenth turn being the first winding of the second layer is wound to be disposed at the inside in the circumferential direction (for example, at the side of the second direction in the axial direction) compared to the related art. That is, since the movement, to the inside in the radial direction, of the conducting wire 14 wound around the flat surface 131 is not regulated, the conducting wire 14 is moved by the force when the conducting wire 14 of the tenth turn is wound, and the conducting wire 14 of the tenth turn is guided to the inside in the circumferential direction, so that the size (height) of the inside in the radial direction of the coil 13 in the circumferential direction is small (low). Thus, contact between the coils 13 formed at the adjacent insulators 12 can be suppressed.

In the motor according to an aspect of the present invention, parts of the conducting wire 14 opposed to two flat surfaces 131 of the two adjacent insulators 12 face each other in the circumferential direction. Thus, contact between the coils 13 formed at the two adjacent insulators 12 can be suppressed.

In the motor according to an aspect of the present invention, other parts of the conducting wire 14 stacked at parts of the conducting wire 14 opposed to the flat surface 131 are disposed at the inside in the circumferential direction with respect to other parts of the conducting wire 14 stacked at parts of the conducting wire 14 fitted into the plurality of recess parts 130. Thus, the conducting wire 14b of the ninth turn of the first layer of the coil 13 is moved to the inside in the radial direction, and the conducting wire 14c of the tenth turn being the first winding of the second layer is wound to be disposed at the inside in the circumferential direction (for example, at the side of the second direction in the axial direction) more than usual.

In the motor according to an aspect of the present invention, parts of the conducting wire 14 opposed to the flat surface 131 are exposed to the outside with respect to other parts of the conducting wire 14 stacked at parts of the conducting wire 14 fitted into the plurality of recess parts 130. Thus, the conducting wire of the ninth turn of the first layer is moved in the radial direction, and the conducting wire of the tenth turn being the first turn of the second row is more likely to be disposed at the inside in the circumferential direction more than usual.

In the motor according to an aspect of the present invention, parts of the conducting wire 14 opposed to the flat surface 131 are located away from the outer surface 125 of the insulator 12 with respect to parts of the conducting wire 14 fitted into the plurality of recess parts 130. Thus, the conducting wire 14b of the ninth turn in the first layer of the coil 13 is easily moved in the radial direction.

As described above, the motor according to an aspect of the present invention includes the substrate 2 having an annular shape provided at the stator 1. The substrate 2 includes the substrate-side first recess part 21 and the substrate-side second recess part 22 recessed at the inside in the radial direction from the outer peripheral end and adjacent to each other in the circumferential direction. Of the two end parts of the conducting wire 14, the first end part 141 is located at the inside of the substrate-side first recess part 21 and the second end part 142 is located at the inside of the substrate-side second recess part 22. The first end part 141 and the second end part 142 of the conducting wire 14 are disposed in a direction opposing each other in the circumferential direction. Thus, the first end part 141 and the second end part 142 of the conducting wire 14 can interpose the substrate protruding part 23 between the substrate-side first recess part 21 and the substrate-side second recess part 22 in the circumferential direction, so that movement of the substrate 2 in the circumferential direction with respect to the stator 1 due to, for example, vibration or the like can be regulated, and a load on the conducting wire 14 arranged between the stator 1 and the substrate 2 can be reduced.

In the motor according to an aspect of the present invention, the first end part 141 is disposed at the inside of the substrate-side first recess part 21 in a state of being inclined toward the substrate-side second recess part 22 in the circumferential direction, and the second end part 142 is disposed at the inside of the substrate-side second recess part 22 in a state of being inclined toward the substrate-side first recess part 21 in the circumferential direction. The first end part 141 and the second end part 142 interpose the substrate protruding part 23 between the substrate-side first recess part 21 and the substrate-side second recess part 22 in the circumferential direction.

As described above, in the motor according to an aspect of the present invention, the insulator 12 includes the wall part 122 having two recess parts (the insulator-side first recess part 126 and the insulator-side second recess part 127) opposed to two drawing positions of the conducting wire 14 drawn out from the coil 13 in the radial direction. One of the two drawing positions is located at the outer peripheral portion of the coil 13, and the other is located at the inside of the outer peripheral portion. The substrate 2 includes the substrate-side first recess part 21 and the substrate-side second recess part 22 recessed at the inside in the radial direction from the outer peripheral end and adjacent to each other in the circumferential direction. The substrate-side first recess part 21 is opposed to the insulator-side first recess part 126, and the substrate-side second recess part 22 is opposed to the insulator-side second recess part 127.

With such a configuration, when the conducting wire 14 drawn out from the coil 13 is connected to the substrate 2, end parts (the first end part 141 and the second end part 142) of the conducting wire 14 can be escaped to recess parts (the insulator-side first recess part 126 and the insulator-side second recess part 127) of the insulator 12 located at the outside in the radial direction. Subsequently, after the substrate 2 is assembled to the stator 1, the end parts of the conducting wire 14 escaped to the recess part of the insulator 12 can be inserted into recess parts (the substrate-side first recess part 21 and the substrate-side second recess part 22) at the substrate 2 side. As a consequence, the stator 1 and the substrate 2 can be assembled without the conducting wire 14 interfering with the insulator 12, and the productivity of the motor can be improved.

In the motor according to an aspect of the present invention, as illustrated in FIG. 9, the position in the circumferential direction of one of the insulator-side first recess part 126 and the insulator-side second recess part 127 is located at a position overlapping one (inside in the circumferential direction) of a pair of outer surfaces 125 opposed to each other in the circumferential direction among the outer surfaces of the accommodation part 121 when viewed in the radial direction. The position of the other recess part in the circumferential direction is shifted to the outside in the circumferential direction when viewed from the radial direction with respect to the other (outside in the circumferential direction) of the pair of outer surfaces 125 opposed to each other in the circumferential direction.

The insulator-side second recess part 127 is formed at a position aligned with one (inside in the circumferential direction) of the outer surface 125 at both ends in the circumferential direction of the accommodation part 121 of the insulator 12 so that the conducting wire 14 at the start of winding of the coil 13 comes in and out. On the other hand, the insulator-side first recess part 126 is formed at the outside in the circumferential direction of one conducting wire from a position aligned with the other (outside in the circumferential direction) of the outer surface 125 at both ends in the circumferential direction of the accommodation part 121 of the insulator 12 so that the conducting wire 14 (conducting wire 14 of the second layer in the present embodiment) at the end of winding of the coil 13 comes in and out. With such a configuration, when the conducting wire 14 drawn out from the coil 13 is connected to the substrate 2, the end parts (the first end part 141 and the second end part 142) of the conducting wire 14 can be escaped to the recess parts (the insulator-side first recess part 126 and the insulator-side second recess part 127) of the insulator 12 located at the outside in the radial direction. Therefore, the stator 1 and the substrate 2 can be assembled without the conducting wire 14 interfering with the insulator 12, and the productivity of the motor can be improved.

First Modification Example of Embodiment

Figure 12A:
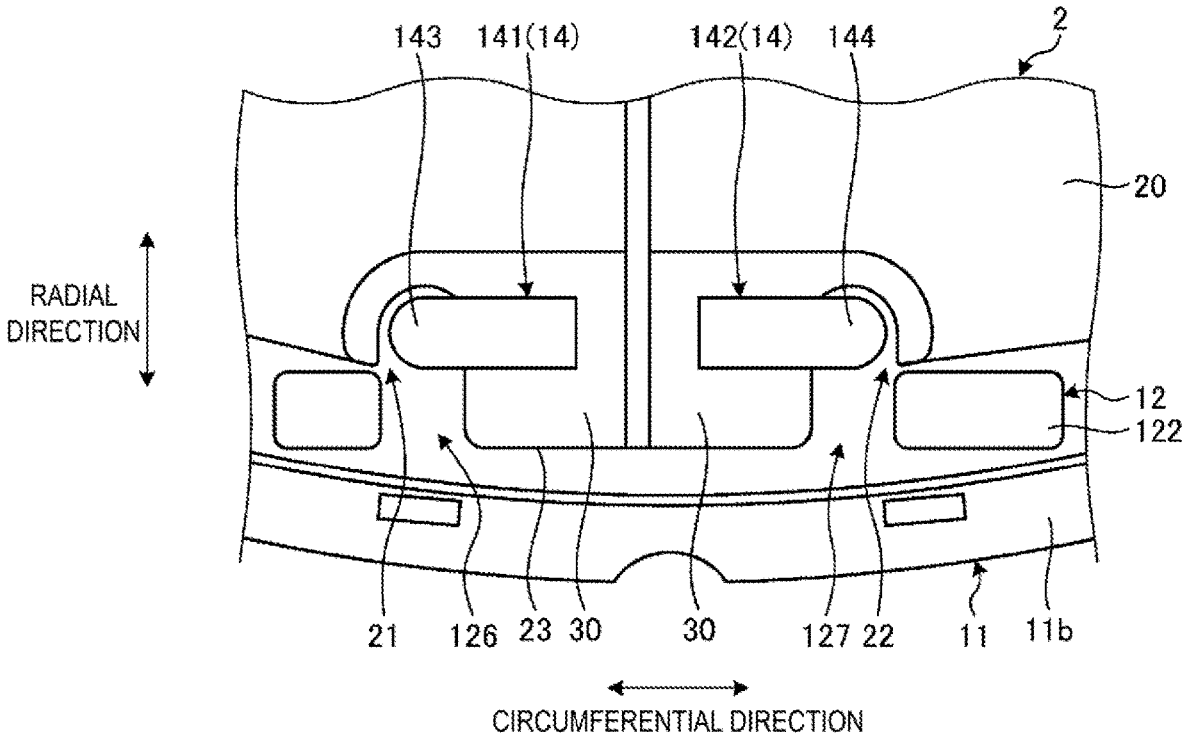
FIG. 12A is an enlarged plan view of a connection portion in a first modification example of the embodiment.
Figure 12B:
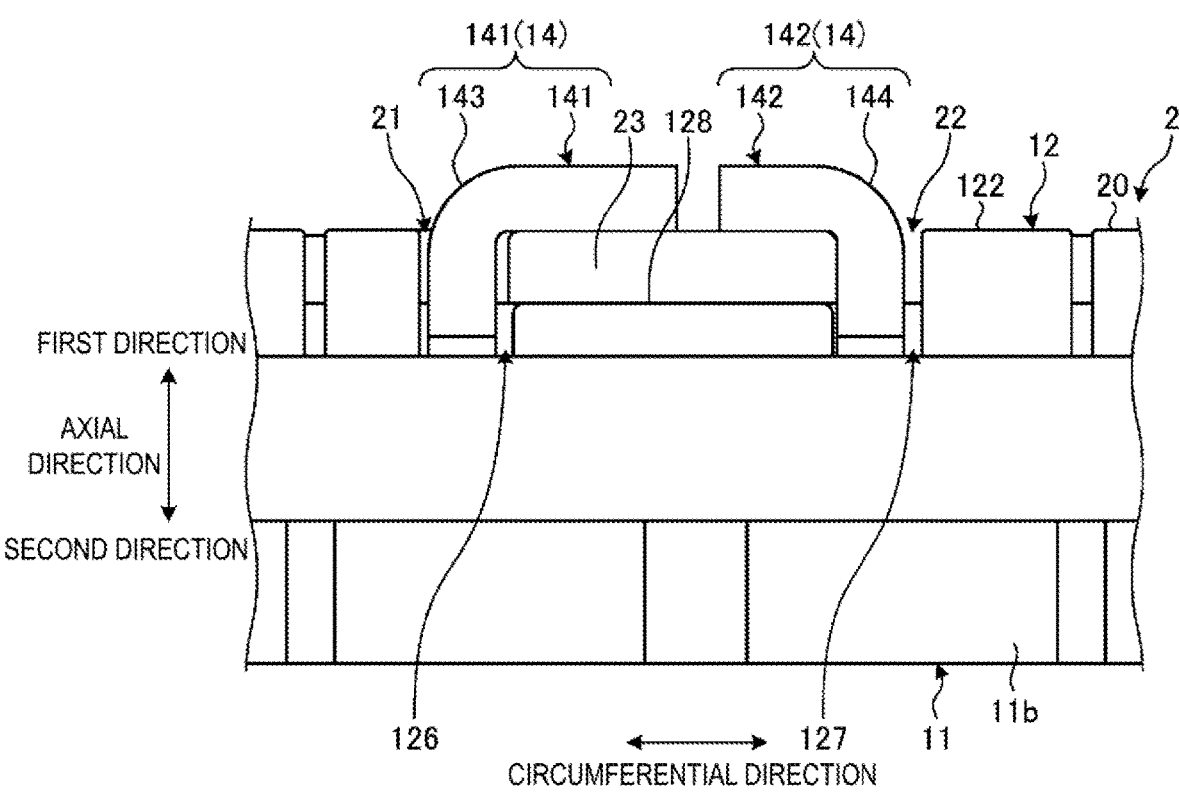
FIG. 12B is an enlarged side view of the connection portion.

In the above embodiment, the first end part 141 of the conducting wire 14 is disposed at the inside of the substrate-side first recess part 21 in a state of being inclined toward the substrate-side second recess part 22 in the circumferential direction, and the second end part 142 of the conducting wire 14 is disposed at the inside of the substrate-side second recess part 22 in a state of being inclined toward the substrate-side first recess part 21 in the circumferential direction; however, the embodiment is not limited to the configuration. FIG. 12A is an enlarged plan view of a connection portion in a first modification example of the embodiment. FIG. 12B is an enlarged side view of the connection portion. A motor according to the first modification example of the embodiment is different from the above embodiment, and in the first modification example, the first end part 141 and the second end part 142 of the conducting wire 14 each have a bent portion.

As illustrated in FIGS. 12A and 12B, the first end part 141 of the conducting wire 14 includes a first bent portion 143 in the assembled state with the substrate 2 assembled to the stator 1. The second end part 142 of the conducting wire 14 includes a second bent portion 144 in the assembled state with the substrate 2 assembled to the stator 1. The first bent portion 143 and the second bent portion 144 are bent in a direction opposing each other. The first bent portion 143 is formed at a portion of the first end part 141 of the conducting wire 14 drawn out straight from the coil 13 toward the side of first direction in the axial direction, the portion protruding from the inside of the substrate-side first recess part 21 to the outside of the first direction side. The first bent portion 143 is bent from the substrate-side first recess part 21 toward the substrate-side second recess part 22 with the substrate protruding part 23 interposed between the substrate-side first recess part 21 and the substrate-side second recess part 22 in the circumferential direction of the substrate 2. The second bent portion 144 is formed at a portion of the second end part 142 of the conducting wire 14 drawn out straight from the coil 13 toward the side of the first direction in the axial direction, the portion protruding from the inside of the substrate-side second recess part 22 to the outside of the first direction side. The second bent portion 144 is bent from the substrate-side second recess part 22 toward the substrate-side first recess part 21 with the substrate protruding part 23 interposed between the substrate-side second recess part 22 and the substrate-side first recess part 21 in the circumferential direction of the substrate 2.

In the motor according to an aspect of the present invention, the first end part 141 of the conducting wire 14 drawn out from the coil 13 includes the first bent portion 143 bent in the circumferential direction of the substrate 2 at a portion protruding from the inside of the substrate-side first recess part 21 to the outside. The second end part 142 of the conducting wire 14 includes the second bent portion 144 bent in the circumferential direction of the substrate 2 at a portion protruding from the inside of the substrate-side second recess part 22 to the outside. The first bent portion 143 and the second bent portion 144 are bent in a direction opposing each other. As described above, the first end part 141 and the second end part 142 of the conducting wire 14 include the first bent portion 143 and the second bent portion 144 bent at the inside in the circumferential direction so as to oppose each other, respectively, so that the substrate protruding part 23 is held in the circumferential direction. Thus, when the conducting wire 14 is drawn out from the coil 13, the first end part 141 and the second end part 142 need not be inclined and drawn out, making it possible to more easily connect the conducting wire 14 and the substrate 2.

Second Modification Example of Embodiment

Figure 13A:
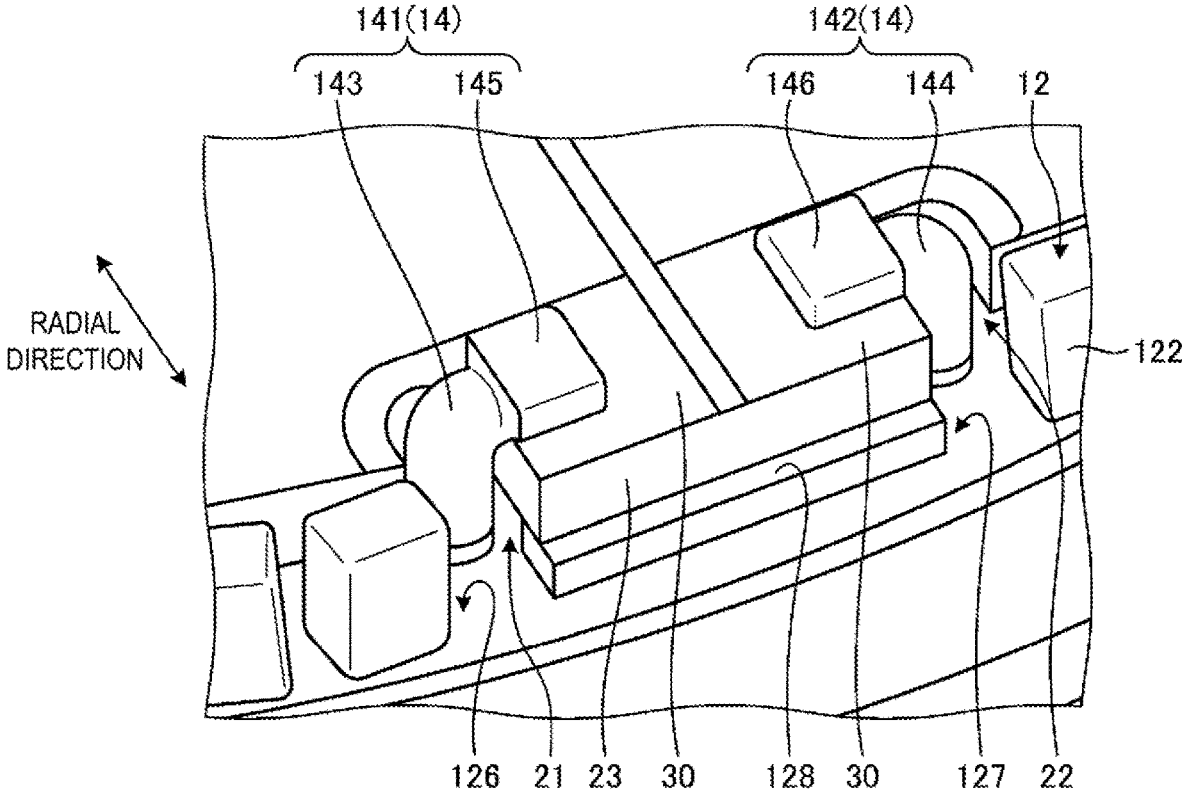
FIG. 13A is an enlarged perspective view of a connection portion in a second modification example of the embodiment.
Figure 13B:
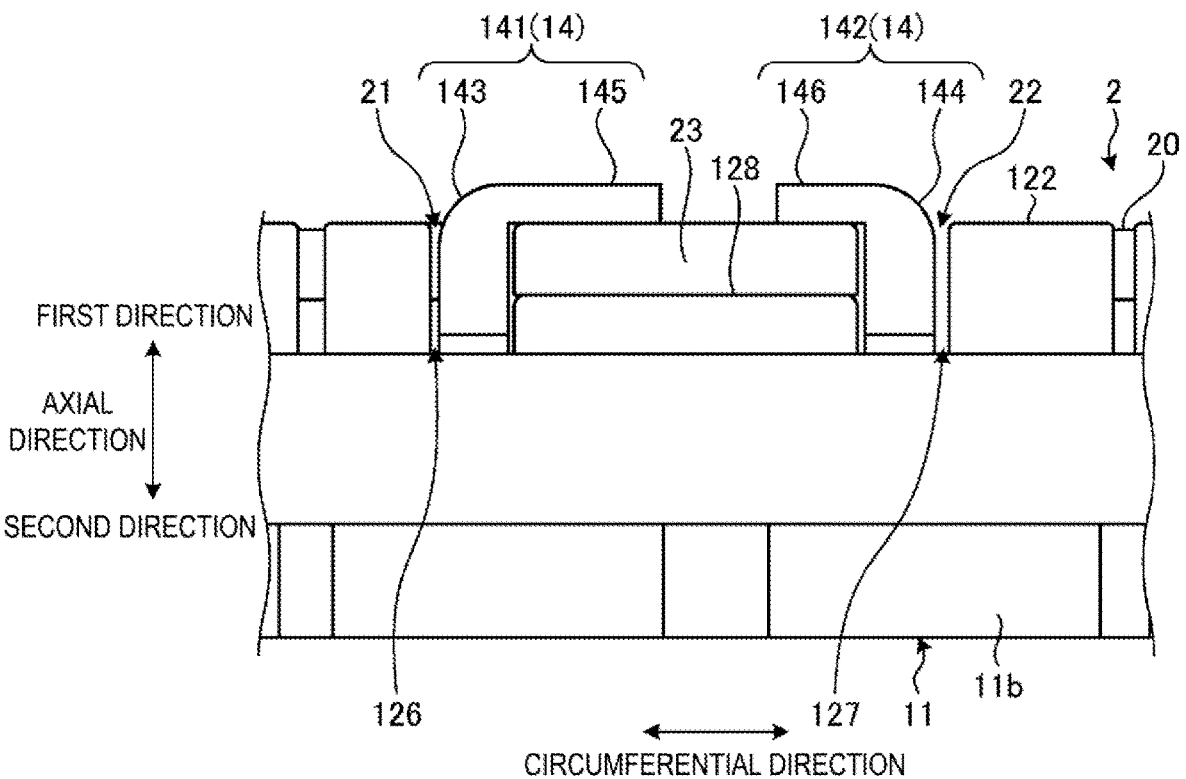
FIG. 13B is an enlarged side view of the connection portion.

In the first modification example of the above embodiment, the first end part 141 and the second end part 142 of the conducting wire 14 each have a bent portion; however, the embodiment is not limited to the configuration. FIG. 13A is an enlarged perspective view of a connection portion in a second modification example of the embodiment. FIG. 13B is an enlarged side view of the connection portion. A motor according to the second modification example of the embodiment is different from the above first modification example, and in the second modification example, the first end part 141 and the second end part 142 of the conducting wire 14 each have a bent portion and a deformed portion.

As illustrated in FIGS. 13A and 13B, the first end part 141 of the conducting wire 14 includes a first deformed portion 145 having a cross-sectional shape different from the cross-sectional shape of the conducting wire 14 in the assembled state with the substrate 2 assembled to the stator 1. The first deformed portion 145 is formed in a rectangular shape when viewed from the axial direction, and is located at the second bent portion 144 side with respect to the first bent portion 143. The first deformed portion 145 is, for example, a portion crushed in the circumferential direction before the first end part 141 is bent at the first bent portion 143. The second end part 142 of the conducting wire 14 includes a second deformed portion 146 having a cross-sectional shape different from the cross-sectional shape of the conducting wire 14 in the assembled state with the substrate 2 assembled to the stator 1. The second deformed portion 146 is formed in a rectangular shape when viewed from the axial direction, and is located at the first bent portion 143 side with respect to the second bent portion 144. The second deformed portion 146 is, for example, a portion crushed in the circumferential direction before the second end part 142 is bent at the second bent portion 144.

In the motor according to an aspect of the present invention, the first end part 141 of the conducting wire 14 includes the first deformed portion 145 located at the second bent portion 144 side with respect to the first bent portion 143 and having a cross-sectional shape different from the cross-sectional shape of the conducting wire 14. The second end part 142 of the conducting wire 14 includes the second deformed portion 146 located at the first bent portion 143 side with respect to the second bent portion 144 and having a cross-sectional shape different from the cross-sectional shape of the conducting wire 14. Thus, by crushing and deforming the first end part 141 and the second end part 142 of the conducting wire 14 in the axial direction, the height in the axial direction of the connection portion can be made lower than the outer diameter of the conducting wire 14. As a consequence, the height in the axial direction of the stator 1 including the substrate 2 can be suppressed and the motor can be reduced in size.

Third Modification Example of Embodiment

Figure 14A:
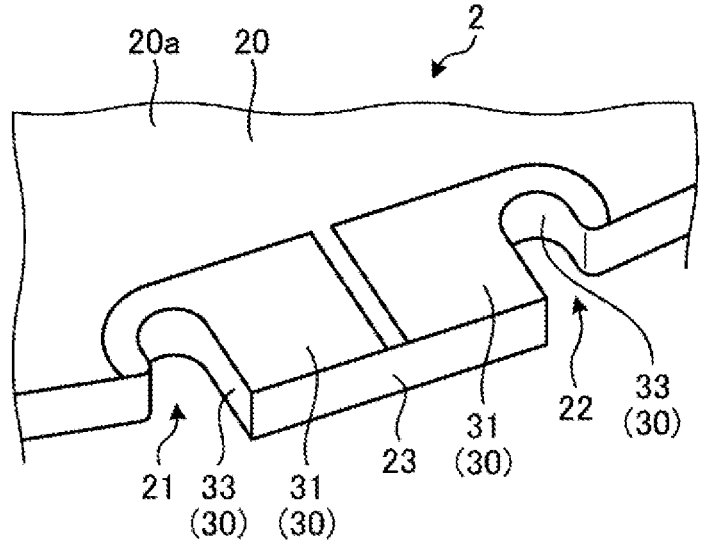
FIG. 14A is an enlarged perspective view of a substrate recess part in a third modification example of the embodiment.
Figure 14B:
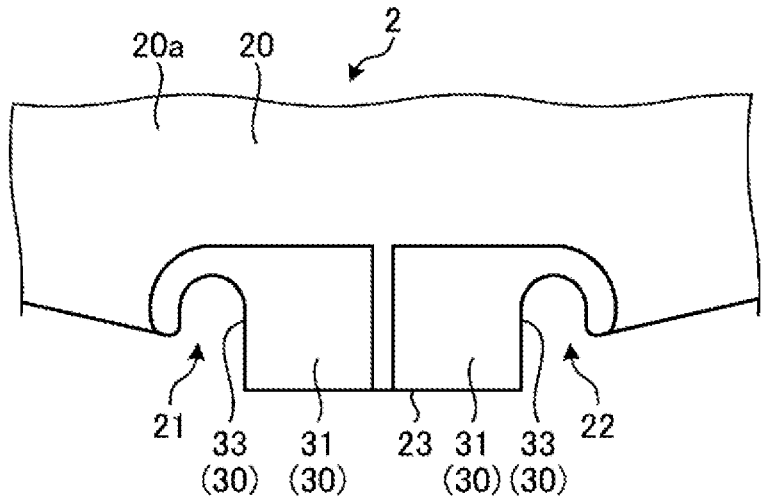
FIG. 14B is an enlarged plan view of a front surface side of the substrate recess part.
Figure 14C:
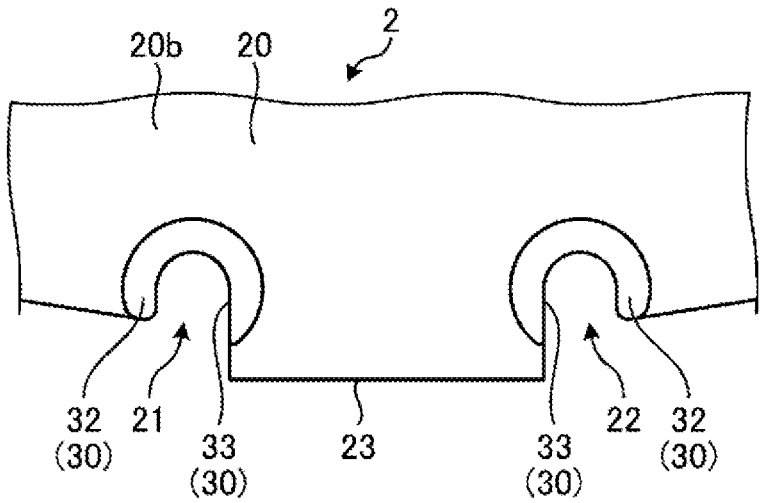
FIG. 14C is an enlarged plan view of a rear surface side of the substrate recess part.
Figure 15:
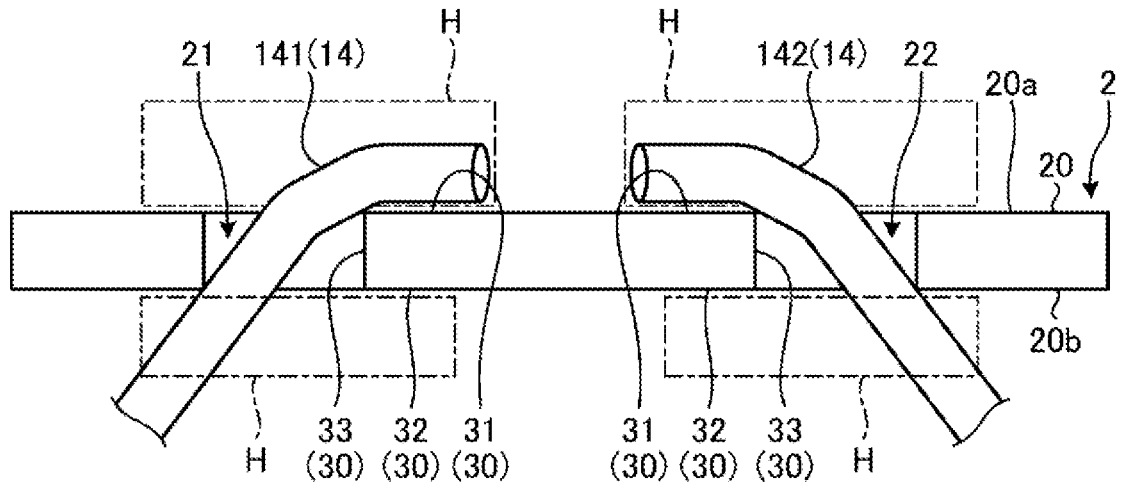
FIG. 15 is a schematic view illustrating an example of a soldering state of a conducting wire to the substrate recess part in the third modification example of the embodiment.

In the above embodiment, the substrate 2 includes the land 30 electrically connected to the end part of the conducting wire 14 drawn out from the coil 13, and the land 30 is provided at the substrate front surface 20a side; however, the embodiment is not limited to the configuration. FIG. 14A is an enlarged perspective view of a substrate recess part in a third modification example of the embodiment. FIG. 14B is an enlarged plan view of a front surface side of the substrate recess part. FIG. 14C is an enlarged plan view of a rear surface side of the substrate recess part. FIG. 15 is a schematic view illustrating an example of a soldering state of a conducting wire to the substrate recess part in the third modification example of the embodiment. A motor according to the third modification example of the embodiment is different from the above embodiment, and in the third modification example, the land 30 is formed not only at the front surface side and the rear surface side of the substrate body 20 but also at the inner peripheral surface of each recess part.

The land 30 includes a first land portion 31, a second land portion 32, and a third land portion 33. The first land portion 31 is disposed at one end surface of the substrate 2 in a thickness direction. Specifically, as illustrated in FIGS. 14A and 14B, the first land portion 31 is disposed at the front surface side of the substrate body 20 along each of the substrate-side first recess part 21 and the substrate-side second recess part 22. The second land portion 32 is disposed at the other end surface of the substrate 2 in the thickness direction. Specifically, as illustrated in FIG. 14C, the second land portion 32 is disposed at the rear surface side of the substrate body 20 along each of the substrate-side first recess part 21 and the substrate-side second recess part 22. As illustrated in FIGS. 14A to 14C, the third land portion 33 is disposed at the inner peripheral surface of each of the substrate-side first recess part 21 and the substrate-side second recess part 22. The first land portion 31, the second land portion 32, and the third land portion 33 communicate with one another. Specifically, in each of the substrate-side first recess part 21 and the substrate-side second recess part 22, the first land portion 31, the second land portion 32, and the third land portion 33 are continuously formed and electrically connected to one another. The first land portion 31 in the third modification example of the present embodiment has a larger area than the third land portion 33. The second land portion 32 has a smaller area than the first land portion 31.

The first end part 141 of the conducting wire 14 is passed through the inside of the substrate-side first recess part 21 in a state of being inclined toward the substrate-side second recess part 22 in the circumferential direction, in the assembled state with the substrate 2 assembled to the stator 1. The second end part 142 of the conducting wire 14 is passed through the inside of the substrate-side second recess part 22 in a state of being inclined toward the substrate-side first recess part 21 in the circumferential direction, in the assembled state with the substrate 2 assembled to the stator 1. As illustrated in FIG. 15, the outer peripheral surfaces of the first end part 141 and the second end part 142 of the conducting wire 14 are in contact with and supported by a peripheral end at the substrate front surface 20*a* side and a peripheral end at a substrate rear surface 20*b* side of the recess parts (the substrate-side first recess part 21 and the substrate-side second recess part 22). Therefore, relative movement of the end parts of the conducting wire 14 being a draw wire with respect to the substrate 2 can be suppressed.

As described above, in the motor according to an aspect of the present invention, the substrate-side first recess part 21 and the substrate-side second recess part 22 are recessed at the inside in the radial direction from the outer peripheral end and open at the outside in the radial direction. Thus, unlike a through hole provided at the substrate 2, the end parts of the conducting wire 14 can be wired at the inside of the substrate-side first recess part 21 and the substrate-side second recess part 22 from the radial direction instead of the axial direction (direction orthogonal to the substrate surface). Therefore, the conducting wire 14 can be easily assembled to the substrate 2 and productivity can be improved. Furthermore, the third land portion 33 is disposed at the inner peripheral surface of each of the substrate-side first recess part 21 and the substrate-side second recess part 22, and the first land portion 31, the second land portion 32, and the third land portion 33 communicate with one another. Thus, when the land 30 and the conducting wire 14 are soldered to each other, not only the first land portion 31 and the conducting wire 14 can be joined, but also the second land portion 32, the third land portion 33 and the conducting wire 14 can be joined. Thus, the strength of a join part between the land 30 and the conducting wire 14 can be improved, and since the conducting wire 14 being a draw wire from the coil 13 is widely connected in the thickness direction of the substrate 2, relative movement between substrate 2 and the conducting wire 14 due to, for example, vibration or the like of the motor can be suppressed, and disconnection or the like of the conducting wire 14 can be prevented.

In the third modification example of the above embodiment, the first end part 141 is disposed at the inside of the substrate-side first recess part 21 in a state of being inclined toward the substrate-side second recess part 22 in the circumferential direction, and the second end part 142 is disposed at the inside of the substrate-side second recess part 22 in a state of being inclined toward the substrate-side first recess part 21 in the circumferential direction; however, the embodiment is not limited to the configuration. The third modification example of the embodiment may be applied to the first modification example and the second modification example of the embodiment.

In the third modification example of the above embodiment, by soldering the first land portion 31 from the substrate front surface 20*a* side, the end part of the conducting wire 14 is soldered and fixed at the substrate 2 at three points by using solder flowing into the third land portion 33 and the second land portion 32 in the order; however, the embodiment is not limited to the configuration. For example, by soldering the first land portion 31 from the substrate front surface 20*a* side, the end part of the conducting wire 14 may be soldered and fixed at the substrate 2 at two points by using solder flowing into the third land portion 33. Alternatively, by soldering the first land portion 31 from the substrate front surface 20*a* side and soldering the second land portion 32 from the substrate rear surface 20*b* side, the end part of the conducting wire 14 may be soldered and fixed at the substrate 2 at three points by using solder flowing into the third land portion 33.

Fourth Modification Example of Embodiment

Figure 16:
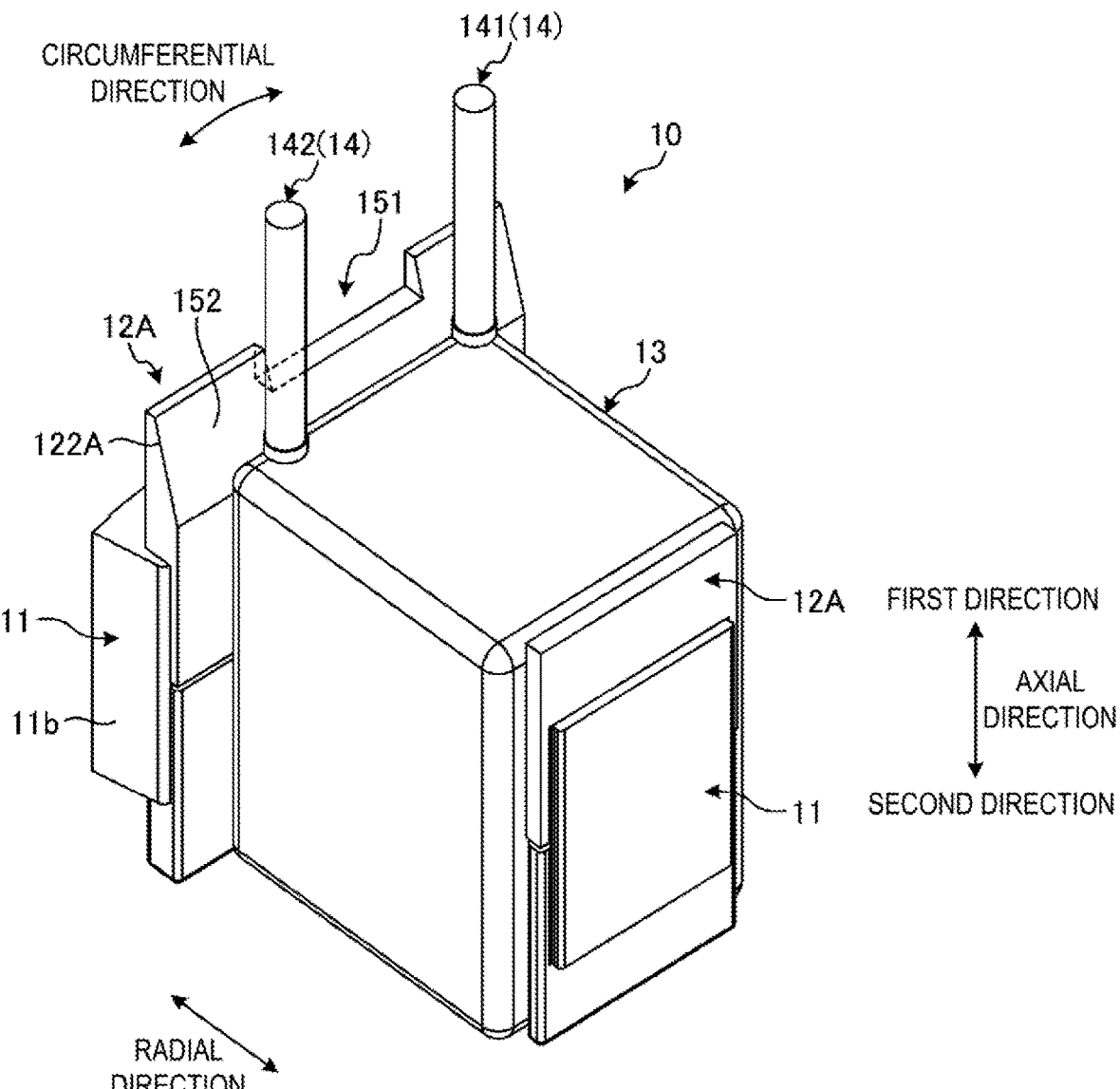
FIG. 16 is an external perspective view of a segment core in a fourth modification example of the embodiment.
Figure 17A:
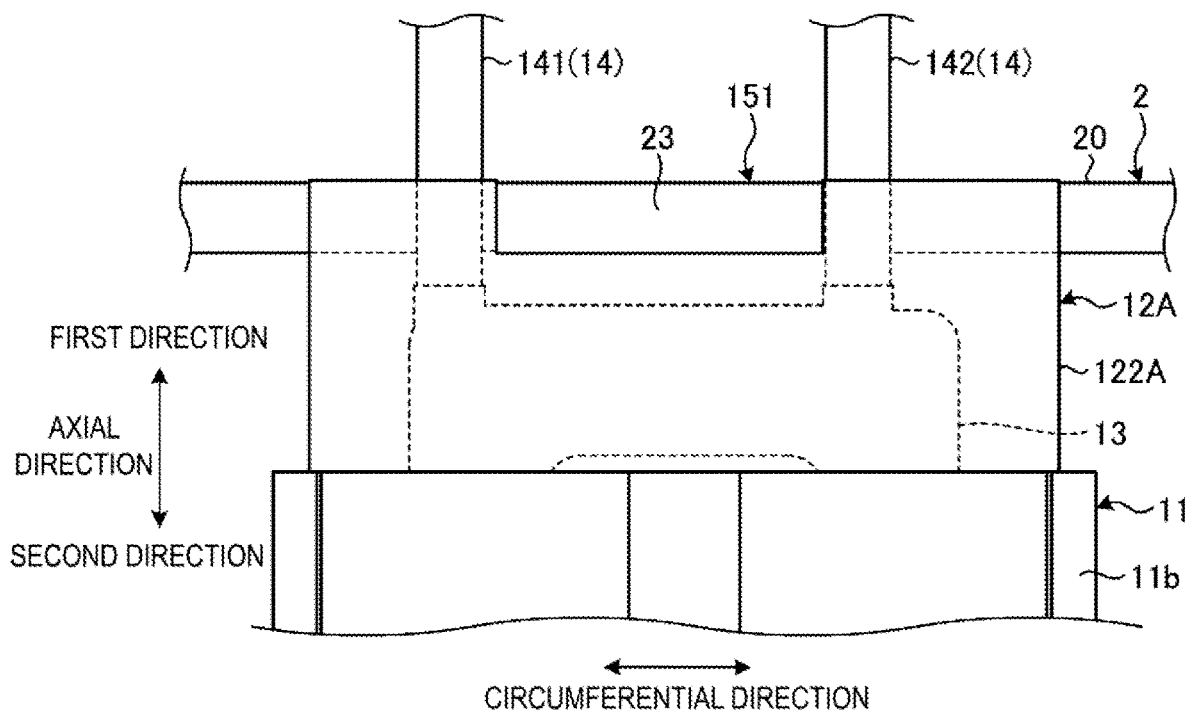
FIG. 17A is an enlarged side view of a connection portion between the segment core and a substrate in the fourth modification example of the embodiment.
Figure 17B:
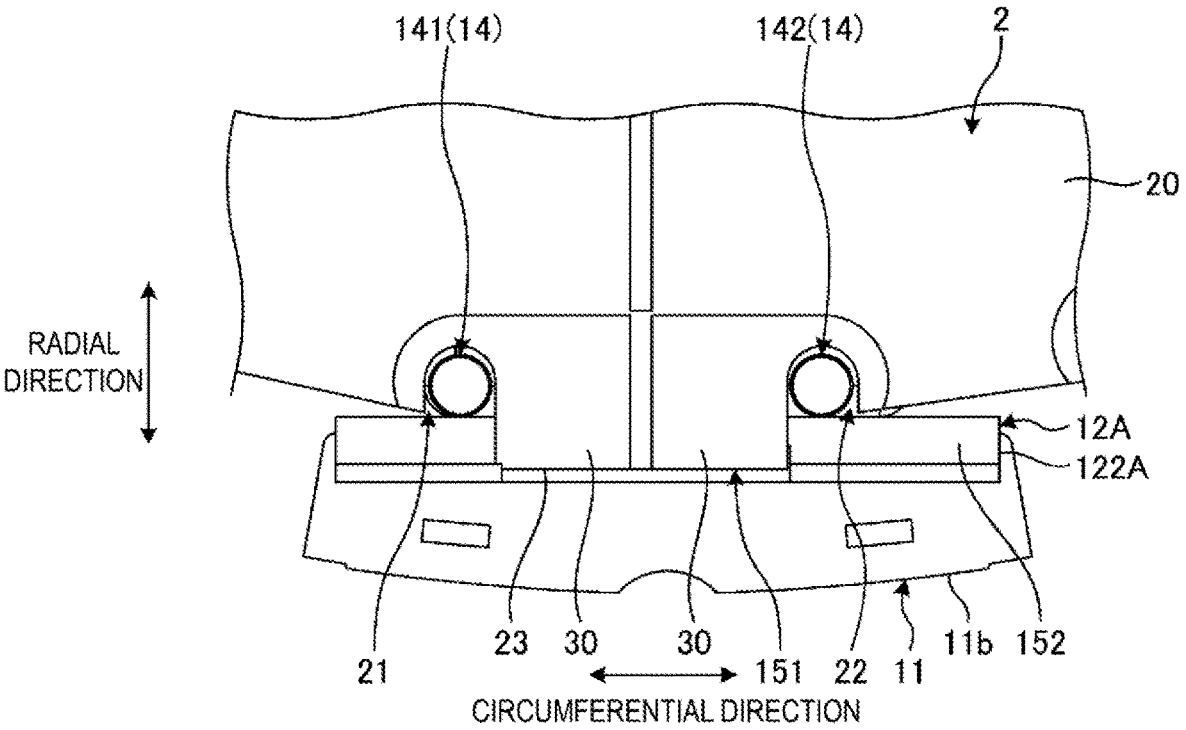
FIG. 17B is an enlarged plan view of the connection portion in the fourth modification example of the embodiment.
Figure 18:
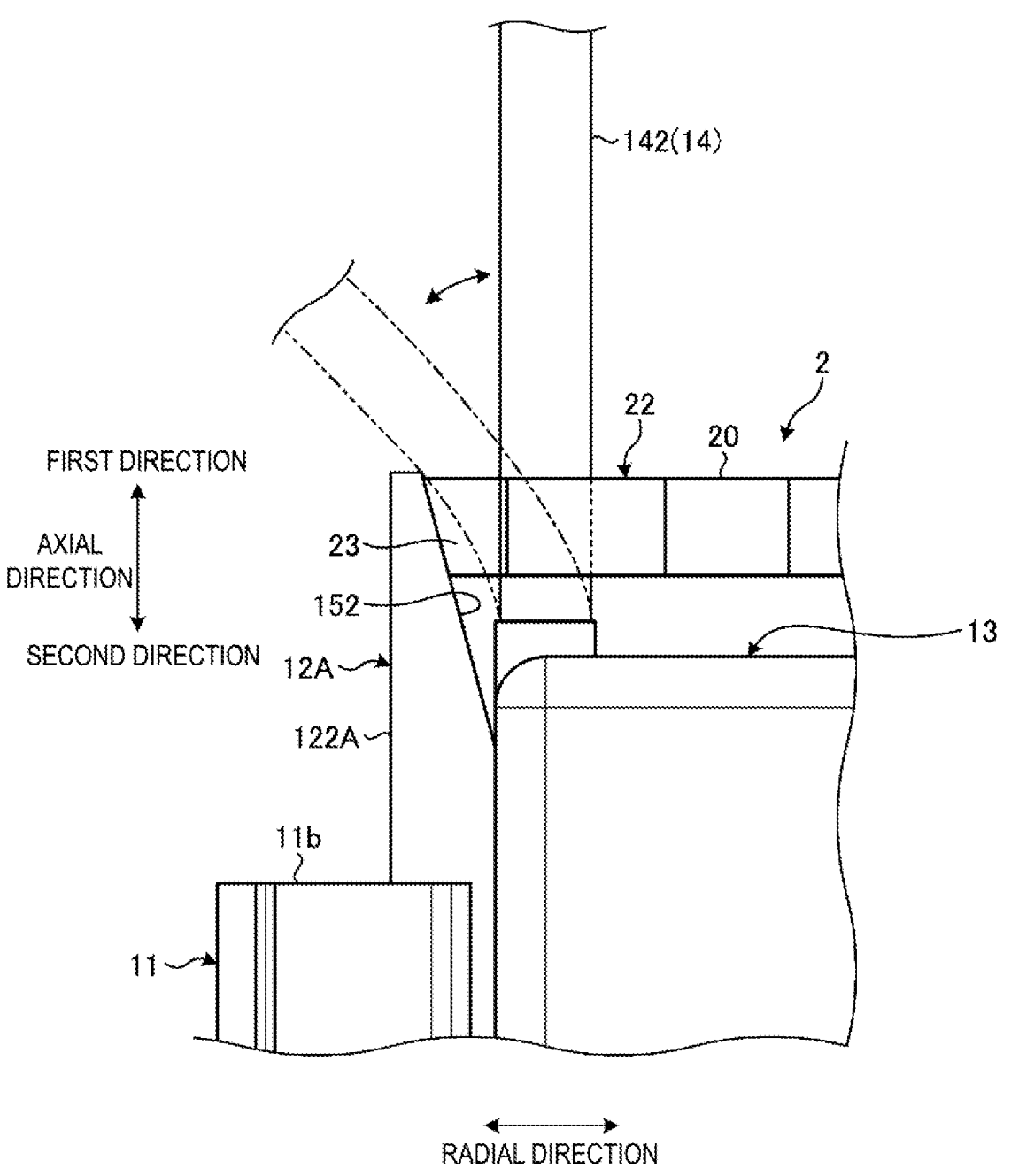
FIG. 18 is a schematic view illustrating a change in a position of a conducting wire when the substrate is assembled to the segment core in the fourth modification example of the embodiment.

In the above embodiment, the wall part 122 of the insulator 12 includes two recess parts (the insulator-side first recess part 126 and the insulator-side second recess part 127) opposed to two drawing positions of the conducting wire 14 drawn out from the coil 13 in the radial direction; however, the embodiment is not limited to the configuration. FIG. 16 is an external perspective view of a segment core in a fourth modification example of the embodiment. FIG. 17A is an enlarged side view of a connection portion between the segment core and a substrate in the fourth modification example of the embodiment. FIG. 17B is an enlarged plan view of the connection portion in the fourth modification example of the embodiment. FIG. 18 is a schematic view illustrating a change in the position of a conducting wire when the substrate is assembled to the segment core in the fourth modification example of the embodiment. A motor according to the fourth modification example of the embodiment is different from the above embodiment, and in the fourth modification example, a wall part 122A of an insulator 12A includes an inclined surface 152.

As illustrated in FIG. 16, the insulator 12A includes the accommodation part 121 and a wall part 122A formed at an end part at the outside in the radial direction of the accommodation part 121. The wall part 122A is located at the outer peripheral side of the substrate 2 in the assembled state with the substrate 2 assembled to the stator 1. When viewed from the radial direction, the wall part 122A is formed in a substantially rectangular shape, and is formed to protrude from the yoke part 11*b* in the axial direction. As illustrated in FIG. 16, the wall part 122A includes a recess part 151 and the inclined surface 152. The recess part 151 is formed to be recessed from an end part of the wall part 122A at the side of the first direction in the axial direction toward the side of the second direction. The recess part 151 is a portion fitted with the substrate protruding part 23 in the assembled state with the substrate 2 assembled to the stator 1. When viewed from the circumferential direction, as illustrated in FIG. 18, the inclined surface 152 is inclined to be thinner in the radial direction from the middle of the wall part 122A in the axial direction toward the end part of the wall part 122A at the side of the first direction. The inclined surface 152 is also inclined from the inner side to the outer side in the radial direction toward the drawing direction of the conducting wire 14 in the assembled state with the substrate 2 assembled to the stator 1.

As described above, in the motor according to an aspect of the present invention, the insulator 12A includes the wall part 122A located at the outer peripheral side of the substrate 2 in the assembled state with the substrate 2 assembled to the stator 1. The wall part 122A includes the inclined surface 152 inclined from the inner side to the outer side in the radial direction toward the drawing direction of the conducting wire 14 in the assembled state with the substrate 2 assembled to the stator 1. Thus, when the conducting wire 14 drawn out from the coil 13 is connected to the substrate 2, the end parts (the first end part 141 and the second end part 142) of the conducting wire 14 can be escaped to the inclined surface 152 side of the insulator 12A at the outside in the radial direction. After the substrate 2 is assembled to the stator 1, the end parts of the conducting wire 14 escaped to the inclined surface 152 side of the insulator 12A can be inserted into the recess parts (the substrate-side first recess part 21 and the substrate-side second recess part 22) at the substrate 2 side. As a consequence, the stator 1 and the substrate 2 can be assembled without the conducting wire 14 interfering with the insulator 12A, and the productivity of the motor can be improved.

In the above embodiment and modification examples, the plurality of recess parts 130 are formed to be recessed from the outer surface 125 toward the side of the second direction in the axial direction; however, the embodiment is not limited to the configuration and the plurality of recess parts 130 may be formed to protrude from the outer surface 125 toward the side of the first direction in the axial direction. Furthermore, one of the four outer surfaces 125 includes the plurality of recess parts 130 and the flat surface 131; however, the embodiment is not limited to the configuration. For example, all of the four outer surfaces 125 may each include the plurality of recess parts 130 and the flat surface 131.

In the above embodiment and modification examples, among the four outer surfaces of 125 of the insulator 12, three outer surfaces are formed only by the flat surface and one outer surface is formed by the plurality of recess parts 130 and the flat surface 131; however, the embodiment is not limited to the configuration. For example, the outer surface 125 formed by the plurality of recess parts 130 and the flat surface 131 may be applied to all of the four outer surfaces 125 constituting the outer peripheral surface of the accommodation part 121 or may be applied to a part of the outer surface 125.

In a motor in the related art, for example, a coil is formed by winding a conducting wire around a stator core via an insulator being an insulating body. Some insulators have a plurality of guide grooves at an outer peripheral surface in order to uniformly wind the coil. However, when the conducting wire is wound around the outer peripheral surface of the insulator, the conducting wire is layered in the radial direction of the stator core, resulting in an increase in the outer diameter of the coil. Therefore, since the distance between the inside portions of coils in the radial direction wound around stator cores adjacent to each other in the circumferential direction becomes short, the coils may come into contact with each other. On the other hand, according to an aspect of the present invention, contact between coils wound around stator cores adjacent to each other in the circumferential direction can be suppressed.

Furthermore, in the related art, a motor includes a plurality of stator cores, and both ends of a conducting wire wound around each stator core are physically and electrically connected to a connection member such as a bus bar or a substrate. However, when the connection member is a substrate, for example, the substrate is moved in the circumferential direction with respect to the stator due to vibration or the like of the motor, and a load is applied to the conducting wire arranged between the stator and the substrate, so the configuration needs to be improved. On the other hand, according to an aspect of the present invention, a load applied to the conducting wire arranged between the stator and the substrate can be reduced.

In addition, in the related art, a motor includes a plurality of stator cores, and both ends of a conducting wire wound around each stator core are physically and electrically connected to a connection member such as a bus bar or a substrate. However, when the connection member is a substrate, for example, since the end part of the conducting wire is passed through a through hole provided at the substrate and then is soldered and connected to a land on the substrate, the configuration needs to be improved in terms of the assemblability of the conducting wire with respect to the substrate. On the other hand, according to an aspect of the present invention, the assemblability of the conducting wire with respect to the substrate can be improved.

Although the embodiment and modification examples of the present invention have been described above, the present invention is not limited to the above embodiment and modification examples, and various modifications can be made without departing from the gist of the present invention. Furthermore, the present invention is not limited by the above embodiment and modification examples. A configuration obtained by appropriately combining the above-mentioned constituent elements is also included in the present invention. Further effects and modification examples can be easily derived by a person skilled in the art. Thus, a wide range of aspects of the present invention are not limited to the above embodiment and various changes can be made.

REFERENCE SIGNS LIST

1 Stator, 2 Substrate, 10 Segment core, 11 Stator core, 11a Tooth part, 11b Yoke part, 12 Insulator, 13 Coil, 14 Conducting wire, 20 Substrate body, 21 Substrate-side first recess part, 22 Substrate-side second recess part, 30 Land, 31 First land portion, 32 Second land portion, 33 Third land portion, 121 Accommodation part, 122 Wall part, 125 Outer surface, 126 Insulator-side first recess part (third recess part), 127 Insulator-side second recess part (fourth recess part), 128 Insulator-side protruding part, 130 Recess part, 131 Flat surface, 132 Protruding part, 141 First end part, 142 Second end part, 143 First bent portion, 144 Second bent portion, 145 First deformed portion, 146 Second deformed portion

The invention claimed is:
1. A motor comprising:
a stator including a magnetic body, an insulator surrounding the magnetic body, and a coil formed of a conducting wire wound around the magnetic body via the insulator; and
a substrate having an annular shape and provided at the stator, wherein
of two drawing positions of the conducting wire drawn out from the coil, one drawing position is at an outer peripheral portion of the coil and the other drawing position is at an inside of the outer peripheral portion,
the substrate includes a first recess part and a second recess part recessed at the inside in a radial direction from an outer peripheral end and adjacent to each other in a circumferential direction,
the insulator includes a wall part located at an outer peripheral side of the substrate in an assembled state with the substrate assembled to the stator,
the wall part includes a third recess part opposed to one of the two drawing positions of the conducting wire and a fourth recess part opposed to the other of the two drawing positions of the conducting wire,
the first recess part is opposed to the third recess part, and the second recess part is opposed to the fourth recess part.
2. A motor comprising:
a stator including a magnetic body, an insulator surrounding the magnetic body, and a coil formed of a conducting wire wound around the magnetic body via the insulator; and a substrate having an annular shape provided at the stator, wherein the insulator includes a wall part located at an outer peripheral side of the substrate in an assembled state with the substrate assembled to the stator, and the wall part includes an inclined surface inclined from an inside to an outside in a radial direction toward a drawing direction of the conducting wire in the assembled state.

3. The motor according to claim 1, wherein the insulator includes an accommodation part including an outer peripheral surface wound around with the conducting wire and accommodating the magnetic body inside, a position in the circumferential direction of one of the third recess part and the fourth recess part is located at a position overlapping one of a pair of the outer surfaces opposing each other in the circumferential direction among the outer peripheral surface of the accommodation part when viewed from the radial direction, and a position of the other recess part in the circumferential direction is shifted to a position at an outside in the circumferential direction when viewed from the radial direction with respect to the other of the pair of the outer surfaces opposed to each other in the circumferential direction.

4. A motor comprising:

a coil formed of a conducting wire; and an insulator including an outer surface surrounded by the coil, wherein the outer surface of the insulator includes a plurality of recess parts and a flat surface, and parts of the conducting wire opposed to the flat surface are spaced from parts of the conducting wire fitted into the plurality of recess parts, other parts of the conducting wire stacked at parts of the conducting wire opposed to the flat surface are disposed at an inside in the circumferential direction with respect to other parts of the conducting wire stacked at parts of the conducting wire fitted into the plurality of recess parts.

5. The motor according to claim 4, comprising:

a plurality of insulators including the insulator; and a plurality of coils including the coil, wherein parts of the conducting wire opposed to two of the flat surfaces of two adjacent of the insulators oppose each other in a circumferential direction.

6. The motor according to claim 4, wherein the coil includes an even number of layers formed of the conducting wire.

7. A motor comprising:

a stator including a magnetic body and a conducting wire wound around the magnetic body; and a substrate having an annular shape provided at the stator, wherein the substrate includes a first recess part and a second recess part recessed at an inside in a radial direction from an outer peripheral end and adjacent to each other in a circumferential direction, and of two end parts of the conducting wire, a first end part is located at an inside of the first recess part, and a second end part is located at an inside of the second recess part, and the first end part and the second end part are disposed in a direction opposing each other in the circumferential direction.

8. The motor according to claim 7, wherein the first end part is disposed at the inside of the first recess part in a state of being inclined toward the second recess part in the circumferential direction, the second end part is disposed at the inside of the second recess part in a state of being inclined toward the first recess part in the circumferential direction, and the first end part and the second end part interpose a substrate protruding part between the first recess part and the second recess part in the circumferential direction.

9. The motor according to claim 8, wherein the first end part includes a first bent portion bent in the circumferential direction of the substrate at a portion protruding from an inside of the first recess part to an outside, the second end part includes a second bent portion bent in the circumferential direction of the substrate at a portion protruding from an inside of the second recess part to an outside, and the first bent portion and the second bent portion are bent in a direction opposing each other.

10. The motor according to claim 9, wherein the first end part includes a first deformed portion located at a side of the second bent portion with respect to the first bent portion and having a cross-sectional shape different from a cross-sectional shape of the conducting wire, and the second end part includes a second deformed portion located at a side of the first bent portion with respect to the second bent portion and having a cross-sectional shape different from the cross-sectional shape of the conducting wire.

11. A motor comprising:

a stator including a magnetic body and a conducting wire wound around the magnetic body; and a substrate having an annular shape and provided at the stator, wherein the substrate includes one or more recess parts recessed at an inside in a radial direction from an outer peripheral end, and a land having conductivity and connected to the conducting wire, an end part of the conducting wire being disposed at an inside of the recess part, the land includes a first land disposed at a front surface side of the substrate along the recess part, a second land disposed at a rear surface side of the substrate along the recess part, and a third land disposed at an inner peripheral surface of the recess part, and the first land, the second land, and the third land communicate with one another.

12. The motor according to claim 11, wherein the end part of the conducting wire is fixed at at least the first land.

13. The motor according to claim 11, wherein the first land has an area larger than the third land.

14. The motor according to claim 11, wherein the end part of the conducting wire is connected to the first land, the second land, and the third land by soldering while being disposed at an inside of the recess part.

15. A motor comprising:

a coil formed of a conducting wire; and an insulator including an outer surface surrounded by the coil, wherein the outer surface of the insulator includes a plurality of recess parts and a flat surface, and parts of the conducting wire opposed to the flat surface are spaced from parts of the conducting wire fitted into the plurality of recess parts, and parts of the conducting wire opposed to the flat surface are exposed to an outside from other parts of the conducting wire stacked at parts of the conducting wire fitted into the plurality of recess parts.

16. A motor comprising:

a coil formed of a conducting wire; and an insulator including an outer surface surrounded by the coil, wherein the outer surface of the insulator includes a plurality of recess parts and a flat surface, and parts of the conducting wire opposed to the flat surface are spaced from parts of the conducting wire fitted into the plurality of recess parts, and parts of the conducting wire opposed to the flat surface are located away from the outer surface with respect to parts of the conducting wire fitted into the plurality of recess parts.

\* \* \* \* \*